United States Patent
Lin et al.

(10) Patent No.: US 10,756,841 B2
(45) Date of Patent: Aug. 25, 2020

(54) SYSTEM FOR REGISTERING AN ONU TO AN OLT IN A PASSIVE OPTICAL NETWORK SYSTEM USING A DEDICATED WAVELENGTH

(71) Applicant: HUAWEI TECHNOLOGIES CO., LTD., Shenzhen, Guangdong (CN)

(72) Inventors: Huafeng Lin, Dongguan (CN); Jinrong Yin, Shenzhen (CN); Dianbo Zhao, Johannesburg (ZA); Xifeng Wan, Dongguan (CN); Shiwei Nie, Dongguan (CN); Gang Zheng, Dongguan (CN); Zhijing Luo, Dongguan (CN); Xiaofei Zeng, Dongguan (CN); Jun Luo, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/418,886

(22) Filed: May 21, 2019

(65) Prior Publication Data
US 2019/0273975 A1   Sep. 5, 2019

Related U.S. Application Data

(63) Continuation of application No. PCT/CN2016/106919, filed on Nov. 23, 2016.

(51) Int. Cl.
*H04J 14/02* (2006.01)
(52) U.S. Cl.
CPC ...... *H04J 14/0236* (2013.01); *H04J 14/0252* (2013.01)
(58) Field of Classification Search
CPC ............ H04J 14/0228–0252; H04J 2014/0253
(Continued)

(56) References Cited

U.S. PATENT DOCUMENTS

2006/0115271 A1   6/2006   Hwang et al.
2007/0116467 A1*   5/2007   Kwon ................ G01M 11/3136
                                                                  398/72
(Continued)

FOREIGN PATENT DOCUMENTS

CN   101252388 A   8/2008
CN   101854208 A   10/2010
(Continued)

OTHER PUBLICATIONS

Office Action issued in Chinese Application No. 201680086538.6 dated Jul. 19, 2019, 8 pages.
(Continued)

*Primary Examiner* — Casey L Kretzer
(74) *Attorney, Agent, or Firm* — Fish & Richardson P.C.

(57) ABSTRACT

The present disclosure relates to passive optical network (PON) systems, optical line terminals (OTLs), and optical network units (ONUs). One example PON system includes an OLT and at least two ONUs. The OLT and the ONUs exchange data on one downstream channel and two upstream channels. The OLT sends downstream data to each ONU on the downstream channel, where the downstream data includes an upstream bandwidth grant used to control each ONU to send upstream data. Each ONU receives the downstream data on the downstream channel, and sends the upstream data on a first upstream channel or a second upstream channel based on the upstream bandwidth grant included in the downstream data. The OLT receives, on the first upstream channel and the second upstream channel, the upstream data sent by each ONU, where a registration function is disabled on the first upstream channel, and enabled on the second upstream channel.

16 Claims, 8 Drawing Sheets

(58) Field of Classification Search
USPC .......................................................... 398/75
See application file for complete search history.

(56) References Cited

U.S. PATENT DOCUMENTS

| | | | |
|---|---|---|---|
| 2007/0140258 A1 | 6/2007 | Tan et al. | |
| 2007/0230957 A1* | 10/2007 | Ozaki | H04J 14/0226 14/226 |
| 2012/0020662 A1 | 1/2012 | Ding et al. | |
| 2013/0230324 A1* | 9/2013 | Gupta | H04L 12/2885 398/66 |
| 2013/0272699 A1 | 10/2013 | Liang | |
| 2014/0270779 A1* | 9/2014 | Lee | H04J 14/025 398/79 |
| 2015/0050024 A1 | 2/2015 | Luo et al. | |
| 2015/0055955 A1 | 2/2015 | Kim et al. | |
| 2015/0373430 A1 | 12/2015 | Kim et al. | |
| 2018/0145788 A1* | 5/2018 | Yoshida | H04L 12/44 |

FOREIGN PATENT DOCUMENTS

| | | |
|---|---|---|
| CN | 102045126 A | 5/2011 |
| CN | 102687427 A | 9/2012 |
| CN | 105830369 A | 8/2016 |
| EP | 3349479 A1 | 7/2018 |
| RU | 2407169 C1 | 12/2010 |
| WO | 2005039078 A1 | 4/2005 |
| WO | 2005082375 A2 | 9/2005 |
| WO | 2006069315 A1 | 6/2006 |

OTHER PUBLICATIONS

Bertignono et al., "Photon Ranging for Upstream ONU Activation Signaling in TWDM-PON," Journal of Lightwave Technology, vol. 34, No. 8, Apr. 15, 2016, 8 pages.
PCT International Search Report and Written Opinion issued in International Application No. PCT/CN2016/106919 dated Jul. 14, 2017, 19 pages (with English translation).
Office Action issued in Russian Application No. 2019118792/07 dated Dec. 5, 2019, 11 pages (with English translation).
Search Report issued in Russian Application No. 2019118792/07 dated Dec. 3, 2019, 4 pages (with English translation).
Office Action issued in Chinese 201680086538.6 dated Jan. 16, 2020, 9 pages (with English translation).
Mcgarry et al., "An Evolutionary WDM Upgrade for EPONs", Jan. 1, 2005, XP055115813, 24 pages.
Extended European Search Report issued in European Application No. 16922324.5 dated Nov. 8, 2019, 10 pages.
Office Action issued in Chinese Application No. 201680086538.6 dated Apr. 9, 2020, 6 pages (with English translation).

* cited by examiner

SYSTEM FOR REGISTERING AN ONU TO AN OLT IN A PASSIVE OPTICAL NETWORK SYSTEM USING A DEDICATED WAVELENGTH

CROSS-REFERENCE TO RELATED APPLICATIONS

This application is a continuation of International Patent Application No. PCT/CN2016/106919, filed on Nov. 23, 2016, the disclosure of which is hereby incorporated by reference in its entirety.

TECHNICAL FIELD

This application relates to the optical communications field, and in particular, to a passive optical network (PON) system, an optical line terminal (OLT), and an optical network unit (ONU).

BACKGROUND

A passive optical network (PON) is a point-to-multipoint network topology structure, and usually includes an optical line terminal (OLT) in a central office, a plurality of optical network units (ONU) at a user end, and an optical distribution network (ODN) located the OLT and the ONU.

In a PON system, a newly added ONU needs to complete registration and activation at an OLT before sending an upstream service data to the OLT over an upstream channel. In an Ethernet passive optical network (EPON) system, an OLT receives, by creating a quiet zone, a registration response packet sent by a newly added ONU over an upstream channel, allocates a logical link identifier (LLID) to the newly added ONU based on a Media Access Control (MAC) address carried in the registration response packet, and completes ranging of the newly added ONU. In a gigabit-capable passive optical network (GPON) system, an OLT receives, by creating a quiet zone, a registration response packet sent by a newly added ONU, allocates an ONU ID based on a serial number (SN) carried in the registration response packet, and further completes ranging of the newly added ONU.

After being registered, a registered ONU sends upstream service data to an OLT over an upstream channel in a Time Division Multiple Access manner (TDMA) and based on an upstream sending timeslot allocated by the OLT, to prevent upstream service data sent by different ONUs from conflicting with each other on the upstream channel. In addition, to avoid a conflict between a registration response packet and the upstream service data on the upstream channel, during registration of a newly added ONU, the OLT stops providing a bandwidth grant for a registered ONU, that is, the registered ONU stops sending upstream service data.

In the PON system, the registered ONU needs to send the upstream service data only after the quiet zones ends. As a result, the upstream service data is sent with a relatively large delay, and a system delay requirement of a low-delay service cannot be satisfied.

SUMMARY

To resolve the problem that because a registered ONU needs to send upstream service data only after a quiet zone ends, the upstream service data is sent with a relatively large delay and a system delay requirement of a low-delay service cannot be satisfied, embodiments of this application provide a PON system, an OLT, and an ONU. The technical solutions are as follows:

According to a first aspect, a PON system is provided. The system includes an OLT and at least two ONUs, the OLT is connected to each ONU by using an ODN, and the OLT and the at least two ONUs exchange data on one downstream channel and two upstream channels;

the OLT sends downstream data to each ONU on the downstream channel, where the downstream data includes an upstream bandwidth grant, and the upstream bandwidth grant is used to control the ONU to send upstream data;

the ONU receives the downstream data on the downstream channel, and sends the upstream data on a first upstream channel or a second upstream channel based on the upstream bandwidth grant included in the downstream data; and the OLT receives, on the first upstream channel and the second upstream channel, the upstream data sent by each ONU, where a registration function is disabled on the first upstream channel, the registration function is enabled on the second upstream channel, and the registration function is used to register an unregistered ONU.

Different from the prior art in which data is exchanged on only one downstream channel and one upstream channel in the PON system, in this embodiment, the downstream channel, the first upstream channel on which the registration function is disabled, and the second upstream channel on which the registration function is enabled are configured in the PON system. In this way, after the OLT sends the downstream data to each ONU on the downstream channel, the ONU can send upstream service data and perform ONU registration on different upstream channels based on the upstream bandwidth grant included in the downstream data, to prevent registration of the ONU from affecting sending of the upstream service data, and satisfy a system delay requirement of a low-delay service.

In a possible design, the downstream data includes a first upstream bandwidth grant and a second upstream bandwidth grant, the first upstream bandwidth grant is used to control the ONU to send upstream data on the first upstream channel, and the second upstream bandwidth grant is used to control the ONU to send upstream data on the second upstream channel.

In a possible design, the OLT generates the first upstream bandwidth grant and the second upstream bandwidth grant, and multiplexes the first upstream bandwidth grant and the second upstream bandwidth grant to obtain the multiplexed upstream bandwidth grant; and the ONU demultiplexer the received upstream bandwidth grant to obtain the first upstream bandwidth grant and the second upstream bandwidth; and sends upstream data on the first upstream channel based on the first upstream bandwidth grant, and sends upstream data on the second upstream channel based on the second upstream bandwidth grant.

In this embodiment, the OLT generates the first upstream bandwidth grant and the second upstream bandwidth grant respectively used to control the first upstream channel and the second upstream channel, and multiplexes the first upstream bandwidth grant and the second upstream bandwidth grant, to provide the multiplexed upstream bandwidth grant for each ONU on the downstream channel. In this way, the ONU can separately control data sending on the first upstream channel and the second upstream channel based on the received upstream bandwidth grant, to ensure that the upstream data sequentially reaches the OLT through the first upstream channel and the second upstream channel, and avoid a conflict between the upstream data.

In a possible design, the first upstream channel is used to transmit upstream service data, and the second upstream channel is used to transmit a registration response packet;

the OLT generates the first upstream bandwidth grant including an upstream sending timeslot, and generates the second upstream bandwidth grant including a registration timeslot; and when the ONU is in a registered state, the ONU sends the upstream service data to the OLT on the first upstream channel based on the upstream sending timeslot in the first upstream bandwidth grant; or when the ONU is in an unregistered state, the ONU sends a registration response packet to the OLT on the second upstream channel based on the registration timeslot in the second upstream bandwidth grant.

Different from the prior art in which the ONU sends the upstream service data and an upstream registration packet to the OLT on a same upstream channel, in this embodiment, based on a registration status of the ONU, when the ONU is in the registered state, the ONU sends the upstream service data to the OLT on the first upstream channel, to perform service communication with the OLT; and when the ONU is in the unregistered state, the ONU sends the registration response packet to the OLT on the second upstream channel, to complete registration with the OLT. In this way, while an unregistered ONU in the PON system is being registered, a registered ONU can still send upstream service data to the OLT, to avoid a delay caused by registration of the ONU in the PON system.

In a possible design, the first upstream channel is used to transmit first upstream service data, and the second upstream channel is used to transmit a registration response packet and second upstream service data;

the OLT generates the first upstream bandwidth grant including a first upstream sending timeslot, and generates the second upstream bandwidth grant including a second upstream sending timeslot and a registration timeslot; and when the ONU is in a registered state, the ONU sends the first upstream service data to the OLT on the first upstream channel based on the first upstream sending timeslot in the first upstream bandwidth grant, and sends the second upstream service data to the OLT on the second upstream channel based on the second upstream sending timeslot in the second upstream bandwidth grant; or when the ONU is in an unregistered state, the ONU sends a registration response packet to the OLT on the second upstream channel based on the registration timeslot in the second upstream bandwidth grant.

In this embodiment, the ONU sends upstream service data of a low-delay service on the first upstream channel, and sends upstream service data of a high-delay service and performs ONU registration on the second upstream channel, thereby sending service data on two upstream channels to improve a transmission rate of the upstream service data while preventing ONU registration from affecting the low-delay service.

In a possible design, the OLT obtains channel transmission quality of the first upstream channel and the second upstream channel; and when the channel transmission quality of the first upstream channel is better than the channel transmission quality of the second upstream channel, the OLT controls the registration function to be disabled on the first upstream channel and controls the registration function to be enabled on the second upstream channel.

In this embodiment, the OLT flexibly configures enabling or disabling of the registration function on an upstream channel based on the channel transmission quality of the first upstream channel and the second upstream channel, to ensure that a low-delay service can be transmitted on an upstream channel with relatively desirable transmission quality, and further improve data transmission quality of the PON system.

In a possible design, the OLT stores the generated upstream bandwidth grant; and the OLT controls receiving of the upstream data based on the upstream bandwidth grant, and/or performs, based on the upstream bandwidth grant, authentication and parsing on the upstream data sent by each ONU.

In this embodiment, the OLT controls receiving of the upstream data by using the generated upstream bandwidth grant, so that the upstream data is received more accurately. In addition, the OLT performs authentication on the received upstream data by using the upstream bandwidth grant, to filter upstream data sent by an unauthorized ONU, thereby preventing an ONU that performs unauthorized access from affecting the PON system and further improving security of the PON system.

In a possible design, the ONU determines a service class of each service based on a delay requirement of the service; and when the service class indicates that the service belongs to a first class, the ONU sends, on the first upstream channel, upstream data corresponding to the service; or when the service class indicates that the service belongs to a second class, the ONU sends, on the second upstream channel, upstream data corresponding to the service, where a delay requirement of a service belonging to the first class is higher than a delay requirement of a service belonging to the second class.

In this embodiment, the ONU classifies services based on a service delay requirement, selects the first upstream channel on which the registration function is disabled, to send upstream data corresponding to a low-delay service, and selects the second upstream channel on which the registration function is enabled, to send upstream data corresponding to a high-delay service, to ensure that the low-delay service is not affected by ONU registration and satisfy a system delay requirement of the low-delay service.

In a possible design, if the system is a GPON system, a BWmap message carries the upstream bandwidth grant; or if the system is an EPON system, a Gate message carries the upstream bandwidth grant.

For different types of PON systems, the OLT adds the upstream bandwidth grant to different types of messages, to implement upstream control over the ONU by using the upstream bandwidth grant and improve applicability of the OLT.

In a possible design, when the BWmap message carries the upstream bandwidth grant, a predetermined bit of a predetermined field in the BWmap message is used to identify an upstream channel corresponding to the BWmap message; and when the Gate message carries the upstream bandwidth grant, a channel identifier field newly added to the Gate message is used to identify an upstream channel corresponding to the Gate message, or operation code of the Gate message is used to identify an upstream channel corresponding to the Gate message, where the predetermined field is a start time field or a grant size field, and the predetermined bit is one most significant bit or two most significant bits of the predetermined field.

In a possible design, the downstream channel, the first upstream channel, and the second upstream channel share the ODN in a wavelength division multiplexing manner, and wavelengths of the first upstream channel and the second upstream channel are different.

In this embodiment, upstream and downstream channels in the PON system separately use different wavelengths, and share the ODN in a wavelength division multiplexing manner, to avoid interference between upstream and downstream channels and ensure normal transmission of upstream data and downstream data.

According to a second aspect, an OLT is provided, where the OLT includes: at least one dynamic bandwidth allocation (DBA) scheduling module, a downstream transmission convergence (TC) module, an upstream TC module, a downstream transmitter, a first upstream burst receiver, and a second upstream burst receiver, where the DBA scheduling module is configured to generate an upstream bandwidth grant, where the upstream bandwidth grant is used to control each ONU to send upstream data;

the downstream TC module is connected to the DBA scheduling module, and is configured to generate, through downstream framing and convergence, downstream data including the upstream bandwidth grant;

the downstream transmitter is connected to the downstream TC module, and is configured to send the downstream data to each ONU on a downstream channel;

the upstream TC module is connected to the first upstream burst receiver, and is configured to receive, by using the first upstream burst receiver, the upstream data sent by each ONU on a first upstream channel; and the upstream TC module is further connected to the second upstream burst receiver, and is configured to receive, by using the second upstream burst receiver, the upstream data sent by each ONU on a second upstream channel, where a registration function is disabled on the first upstream channel, the registration function is enabled on the second upstream channel, and the registration function is used to register an unregistered ONU.

Different from the prior art in which the OLT receives upstream service data and performs ONU registration on one upstream channel, in this embodiment, the OLT receives upstream service data and performs ONU registration respectively on the first upstream channel on which the registration function is disabled and the second upstream channel on which the registration function is enabled, to prevent ONU registration from affecting sending of upstream data of a low-delay service while ensuring normal ONU registration, and satisfy a system delay requirement of the low-delay service.

In a possible design, the downstream data includes a first upstream bandwidth grant and a second upstream bandwidth grant, the first upstream bandwidth grant is used to control the ONU to send upstream data on the first upstream channel, and the second upstream bandwidth grant is used to control the ONU to send upstream data on the second upstream channel.

In a possible design, the OLT includes a first DBA scheduling module, a second DBA scheduling module, and a multiplexing module, where the first DBA scheduling module is configured to generate the first upstream bandwidth grant;

the second DBA scheduling module is configured to generate the second upstream bandwidth grant;

the multiplexing module is connected to the first DBA scheduling module and the second DBA scheduling module, and is configured to multiplex the first upstream bandwidth grant and the second upstream bandwidth grant; and the multiplexing module is further connected to the downstream TC module, and is configured to provide the multiplexed upstream bandwidth grant for the downstream TC module.

In this embodiment, the OLT generates the first upstream bandwidth grant by using the first DBA scheduling module and generates the second upstream bandwidth grant by using the second DBA scheduling module, and multiplexes the first upstream bandwidth grant and the second upstream bandwidth grant by using the multiplexing module, to provide the multiplexed upstream bandwidth grant for each ONU on the downstream channel. In this way, the ONU can separately control sending of upstream data on the first upstream channel and the second upstream channel based on the received upstream bandwidth grant, to ensure that the upstream data sequentially reaches the OLT through the first upstream channel and the second upstream channel, and avoid a conflict between the upstream data.

In a possible design, the first upstream channel is used to transmit upstream service data, and the second upstream channel is used to transmit a registration response packet;

the first DBA scheduling module is configured to generate the first upstream bandwidth grant including an upstream sending timeslot; and the second DBA scheduling module is configured to generate the second upstream bandwidth grant including a registration timeslot, where the upstream sending timeslot is used to instruct the registered ONU to send the upstream service data on the first upstream channel, and the registration timeslot is used to instruct the unregistered ONU to send the registration response packet on the second upstream channel.

In this embodiment, the OLT controls, by using the first DBA scheduling module, the first upstream channel to be used only to transmit the upstream service data, and controls, by using the second DBA scheduling module, the second upstream channel to be used only to transmit the registration response packet, so that while an unregistered ONU in a PON system sends the registration response packet on the second upstream channel, a registered ONU can still send the upstream service data on the first upstream channel, to prevent ONU registration from affecting sending of the upstream service data.

In a possible design, the first upstream channel is used to transmit first upstream service data, and the second upstream channel is used to transmit a registration response packet and second upstream service data;

the first DBA scheduling module is configured to generate the first upstream bandwidth grant including a first upstream sending timeslot; and the second DBA scheduling module is configured to generate the second upstream bandwidth grant including a second upstream sending timeslot and a registration timeslot, where the first upstream sending timeslot is used to instruct the registered ONU to send the first upstream service data on the first upstream channel, the second upstream sending timeslot is used to instruct the registered ONU to send the second upstream service data on the second upstream channel, the registration timeslot is used to instruct the unregistered ONU to send the registration response packet on the second upstream channel, and a delay requirement of the first upstream service data is higher than a delay requirement of the second upstream service data.

In this embodiment, the OLT controls, by using the first DBA scheduling module, the first upstream channel to be used only to transmit upstream service data corresponding to a low-delay service, and controls, by using the second DBA scheduling module, the second upstream channel to be used to transmit a registration response packet and upstream service data corresponding to a high-delay service, thereby sending upstream service data on two upstream channels to improve a transmission rate of the upstream service data while preventing ONU registration from affecting the low-delay service.

In a possible design, the OLT further includes a control module, and the control module is connected to the first DBA scheduling module and the second DBA scheduling module; and the control module is configured to: control the first DBA scheduling module to disable the registration function, and control the second DBA scheduling module to enable the registration function, where the second upstream bandwidth grant generated by the second DBA scheduling module that enables the registration function includes the registration timeslot, and the registration timeslot is used to instruct the unregistered ONU to send the registration response packet on the second upstream channel.

In this embodiment, the control module is disposed in the OLT, and the control module is configured to control the first DBA scheduling module and the second DBA scheduling module to enable and disable the registration function, to flexibly configure the first upstream channel and the second upstream channel.

In a possible design, the OLT includes one DBA scheduling module and a control module connected to the DBA scheduling module;

the control module is configured to control the DBA scheduling module to enable or disable the registration function;

when disabling the registration function, the DBA scheduling module is configured to: generate the first upstream bandwidth grant including a first upstream sending timeslot, or generate the first upstream bandwidth grant including the first upstream sending timeslot and the second upstream bandwidth grant including a second upstream sending timeslot; and when enabling the registration function, the DBA scheduling module is further configured to generate the first upstream bandwidth grant including the first upstream sending timeslot and the second upstream bandwidth grant including a registration timeslot, where the first upstream sending timeslot is used to instruct the registered ONU to send upstream service data on the first upstream channel, the second upstream sending timeslot is used to instruct the registered ONU to send upstream service data on the second upstream channel, and the registration timeslot is used to instruct the unregistered ONU to send a registration response packet on the second upstream channel.

In this embodiment, the OLT controls, by using the control module, the DBA scheduling module to enable or disable the registration function, and the DBA scheduling module generates the corresponding first upstream bandwidth grant and the corresponding second upstream bandwidth grant based on enabling and disabling states of the registration function, to sequentially manage the first upstream channel and the second upstream channel.

In a possible design, the OLT further includes a memory;

the memory is connected to each DBA scheduling module, and is configured to store the upstream bandwidth grant generated by each DBA scheduling module; and the upstream TC module is connected to the memory, and is configured to: control, based on the upstream bandwidth grant, the first upstream burst receiver and the second upstream burst receiver to receive the upstream data, and/or perform, based on the upstream bandwidth grant, authentication and parsing on the upstream data sent by each ONU.

In this embodiment, the upstream TC module controls, by using the generated upstream bandwidth grant, each upstream burst receiver to receive the upstream data, so that the upstream data is received more accurately. In addition, the upstream TC module performs authentication on the received upstream data by using the upstream bandwidth grant, to filter upstream data sent by an unauthorized ONU, thereby preventing an ONU that performs unauthorized access from affecting the PON system and further improving security of the PON system.

In a possible design, if the OLT is used in a GPON system, a BWmap message carries the upstream bandwidth grant; or if the OLT is used in an EPON system, a Gate message carries the upstream bandwidth grant.

In a possible design, when the BWmap message carries the upstream bandwidth grant, a predetermined bit of a predetermined field in the BWmap message is used to identify an upstream channel corresponding to the BWmap message; and when the Gate message carries the upstream bandwidth grant, a channel identifier field newly added to the Gate message is used to identify an upstream channel corresponding to the Gate message, or operation code of the Gate message is used to identify an upstream channel corresponding to the Gate message, where the predetermined field is a start time field or a grant size field, and the predetermined bit is one most significant bit or two most significant bits of the predetermined field.

In a possible design, the downstream channel, the first upstream channel, and the second upstream channel share one optical distribution network (ODN) in a wavelength division multiplexing manner, and wavelengths of the first upstream channel and the second upstream channel are different.

According to a third aspect, an ONU is provided. The ONU includes: a downstream TC module, at least one DBA response module, an upstream TC module, a downstream receiver, a first upstream burst transmitter, and a second upstream burst transmitter;

the downstream TC module is connected to the downstream receiver and the DBA response module, and is configured to provide, for the DBA response module, downstream data received by the downstream receiver on a downstream channel, where the downstream data is sent by an OLT;

the DBA response module is connected to the upstream TC module, and is configured to control, based on an upstream bandwidth grant included in the downstream data, the upstream TC module to send upstream data;

the upstream TC module is connected to the first upstream burst transmitter, and is configured to send the upstream data on a first upstream channel by using the first upstream burst transmitter; and the upstream TC module is connected to the second upstream burst transmitter, and is configured to send the upstream data on a second upstream channel by using the second upstream burst transmitter, where a registration function is disabled on the first upstream channel, the registration function is enabled on the second upstream channel, and the registration function is used to register an unregistered ONU.

Different from the prior art in which the ONU sends upstream service data and performs ONU registration on one upstream channel, in this embodiment, the ONU sends upstream service data and performs ONU registration respectively on the first upstream channel on which the registration function is disabled and the second upstream channel on which the registration function is enabled, to prevent ONU registration from affecting sending of upstream service data, and satisfy a system delay requirement of a low-delay service.

In a possible design, the downstream data includes a first upstream bandwidth grant and a second upstream bandwidth grant, the first upstream bandwidth grant is used to control the ONU to send upstream data on the first upstream channel, and the second upstream bandwidth grant is used to control the ONU to send upstream data on the second upstream channel.

In a possible design, the ONU includes a first DBA response module, a second DBA response module, and a demultiplexing module, where the demultiplexing module is connected to the downstream TC module, and is configured to demultiplex the upstream bandwidth grant received by the downstream TC module, to obtain the first upstream bandwidth grant and the second upstream bandwidth grant;

the first DBA response module is connected to the demultiplexing module, and is configured to control, based on the first upstream bandwidth grant, the upstream TC module to send the upstream data on the first upstream channel; and the second DBA response module is connected to the demultiplexing module, and is configured to control, based on the second upstream bandwidth grant, the upstream TC module to send the upstream data on the second upstream channel.

In this embodiment, after receiving the downstream data, the ONU demultiplexer the upstream bandwidth grant in the downstream data by using the demultiplexing module, to obtain the first upstream bandwidth grant and the second upstream bandwidth grant, and separately sends the upstream data based on the first upstream bandwidth grant and the second upstream bandwidth grant, to ensure that the upstream data sequentially reaches the OLT and avoid a conflict between the upstream data.

In a possible design, the first upstream channel is used to transmit upstream service data, and the second upstream channel is used to transmit a registration response packet;

if the ONU is in a registered state, the upstream TC module is configured to send a first enabling signal to the first upstream burst transmitter based on an upstream sending timeslot in the first upstream bandwidth grant, where the first enabling signal is used to instruct the first upstream burst transmitter to send the upstream service data on the first upstream channel; and if the ONU is in an unregistered state, the upstream TC module is configured to send a second enabling signal to the second upstream burst transmitter based on a registration timeslot in the second upstream bandwidth grant, where the second enabling signal is used to instruct the second upstream burst transmitter to send the registration response packet on the second upstream channel.

In this embodiment, the first upstream channel is configured to be used only to transmit the upstream service data, and the second upstream channel is configured to be used only to transmit the registration response packet, so that while an unregistered ONU in the PON system sends the registration response packet on the second upstream channel, a registered ONU can send the upstream service data on the first upstream channel, to prevent a registration data packet from affecting sending of the upstream service data.

In a possible design, the ONU includes an optical module slot, and the optical module slot is used for a first optical module or a second optical module to slot into;

the first optical module includes at least the downstream receiver and the first upstream burst transmitter; and the second optical module includes at least the downstream receiver and the second upstream burst transmitter, where when the ONU is in the unregistered state, the second optical module is slot into the optical module slot; or when the ONU is in the registered state, the first optical module is slot into the optical module slot.

In this embodiment, the downstream receiver and the first upstream burst transmitter are integrated into the first optical module, and the downstream receiver and the second upstream burst transmitter are integrated into the second optical module, so that different newly added ONUs all can complete ONU registration by using the same second optical module, thereby improving utilization of the second upstream burst transmitter and reducing ONU manufacturing costs.

In a possible design, the first upstream channel is used to transmit first upstream service data, the second upstream channel is used to transmit a registration response packet and second upstream service data, and a delay requirement of the first upstream service data is higher than a delay requirement of the second upstream service data;

if the ONU is in a registered state, the upstream TC module is configured to: send a third enabling signal to the first upstream burst transmitter based on a first upstream sending timeslot in the first upstream bandwidth grant, where the third enabling signal is used to instruct the first upstream burst transmitter to send the first upstream service data on the first upstream channel; and send a fourth enabling signal to the second upstream burst transmitter based on a second upstream sending timeslot in the second upstream bandwidth grant, where the fourth enabling signal is used to instruct the second upstream burst transmitter to send the second upstream service data on the second upstream channel; and if the ONU is in an unregistered state, the upstream TC module is configured to send a fifth enabling signal to the second upstream burst transmitter based on a registration timeslot in the second upstream bandwidth grant, where the fifth enabling signal is used to instruct the second upstream burst transmitter to send the registration response packet on the second upstream channel.

In this embodiment, the first upstream channel is configured to be used only to transmit the first upstream service data, and the second upstream channel is configured to transmit the registration response packet and the second upstream service data, to transmit the upstream service data on two upstream channels to improve a transmission rate of the upstream service data in the PON system while ensuring that ONU registration does not affect sending of the first upstream service data.

In a possible design, the ONU further includes a service classification module;

the service classification module is configured to: collect a delay requirement of each service and determine a service class of the service based on the delay requirement;

the DBA response module is connected to the service classification module, and is configured to: when the service class indicates that the service belongs to a first class, control the upstream TC module to send, on the first upstream channel, the first upstream service data corresponding to the service; and the DBA response module is further configured to: when the service class indicates that the service belongs to a second class, control the upstream TC module to send, on the second upstream channel, the second upstream service data corresponding to the service.

In this embodiment, the ONU classifies services by using the service classification module, selects the first upstream channel on which the registration function is disabled, to send upstream data corresponding to a low-delay service, and selects the second upstream channel on which the registration function is enabled, to send upstream data corresponding to a high-delay service, to ensure that the low-delay service is not affected by ONU registration and satisfy a system delay requirement of the low-delay service.

In a possible design, the ONU includes a first optical module slot and a second optical module slot, the first optical module slot is used for the first optical module to slot into, and the second optical module slot is used for the second optical module to slot into;

the first optical module includes at least the first upstream burst transmitter; and the second optical module includes at least the downstream receiver and the second upstream burst transmitter, where when the second upstream service data is transmitted, the second optical module is slot into the second optical module slot; and when the first upstream service data and the second upstream service data are transmitted, the second optical module is slot into the second optical module slot and the first optical module is slot into the first optical module slot.

In a possible design, the ONU includes one DBA response module and a channel selection module;

the channel selection module is connected to the first upstream burst transmitter, the second upstream burst transmitter, and the upstream TC module;

the DBA response module is configured to: control, based on the first upstream bandwidth grant, the upstream TC module to send upstream service data, or control, based on the second upstream bandwidth grant, the upstream TC module to send a registration response packet; and the channel selection module is configured to: when the ONU is in a registered state, select the first upstream burst transmitter to send the upstream service data generated by the upstream TC module, or when the ONU is in an unregistered state, select the second upstream burst transmitter to send the registration response packet generated by the upstream TC module.

In this embodiment, the channel selection module of the ONU sends the upstream service data on the first upstream channel, or sends the registration response packet on the second upstream channel based on a registration status of the ONU, to dynamically perform energy conservation of the ONU.

In a possible design, if the ONU is used in a GPON system, a BWmap message carries the upstream bandwidth grant; or if the ONU is used in an EPON system, a Gate message carries the upstream bandwidth grant.

In a possible design, when the BWmap message carries the upstream bandwidth grant, a predetermined bit of a predetermined field in the BWmap message is used to identify an upstream channel corresponding to the BWmap message; and when the Gate message carries the upstream bandwidth grant, a channel identifier field newly added to the Gate message is used to identify an upstream channel corresponding to the Gate message, or operation code of the Gate message is used to identify an upstream channel corresponding to the Gate message, where the predetermined field is a start time field or a grant size field, and the predetermined bit is one most significant bit or two most significant bits of the predetermined field.

In a possible design, the downstream channel, the first upstream channel, and the second upstream channel share one ODN in a wavelength division multiplexing manner, and wavelengths of the first upstream channel and the second upstream channel are different.

DESCRIPTION OF EMBODIMENTS

To make the objectives, technical solutions, and advantages of this application clearer, the following further describes the implementations of this application in detail with reference to the accompanying drawings.

In this specification, "a plurality of" means two or more than two. The term "and/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

In the prior art, a PON system includes only one downstream channel and one upstream channel. An OLT sends downstream data to a registered ONU on the downstream channel in a time division multiplexing manner. Correspondingly, each registered ONU sends upstream service data to the OLT on the upstream channel in an upstream sending timeslot of the ONU in a Time Division Multiple Access manner, to avoid a conflict between the upstream service data. However, because a newly added ONU in the PON system also needs to be registered with the OLT on the upstream channel, during registration of the newly added ONU (usually 200 μs to 250 μs), each registered ONU needs to stop sending upstream service data on the upstream channel, to prevent a registration response packet sent by the newly added ONU from conflicting with the upstream service data sent by the registered ONU. Although a conflict between the upstream service data and the registration response packet can be effectively avoided by using the foregoing conflict prevention mechanism, a delay of the upstream service data is increased. As a result, the existing PON system cannot satisfy a delay requirement of a low-delay service such as a high-definition video (4K or 8K video) service, an augmented reality (AR) service, a virtual reality (VR) service, or a mobile fronthaul service.

In the embodiments of this application, the PON system includes one downstream channel and two upstream channels, a registration function is enabled on one of the two upstream channels, and the registration function is disabled on the other. In the PON system, while an unregistered ONU performs registration and activation on the upstream channel on which the registration function is enabled, a registered ONU may send upstream service data on the upstream channel on which the registration function is disabled. In other words, the OLT can simultaneously receive the upstream service data and a registration response packet sent by the ONUs, to prevent ONU registration and activation from affecting sending of the upstream service data.

Figure 1:
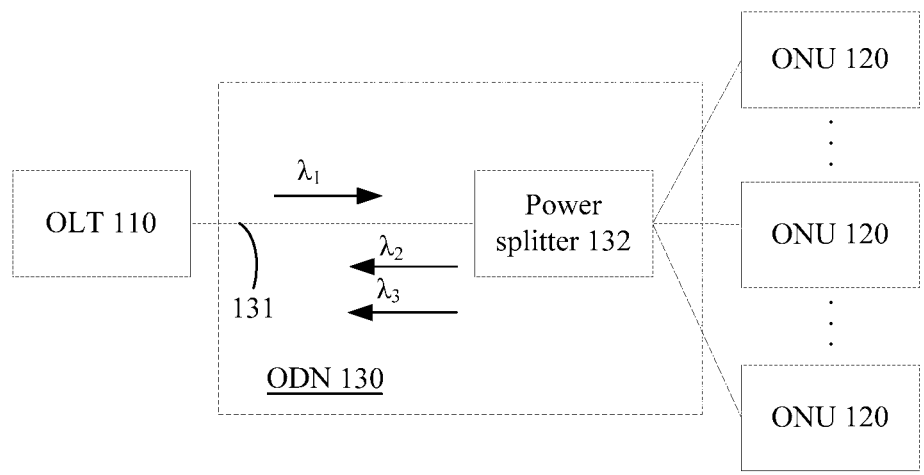
FIG. 1 is an architectural system diagram of a PON system according to an embodiment of this application.

FIG. 1 is an architectural system diagram of a PON system according to an embodiment of this application. The PON system includes an OLT 110 and at least one ONU 120, and the OLT 110 is connected to each ONU 120 by using an ODN 130.

The OLT 110 is a central office device in the PON system, and has functions such as ONU registration, bandwidth allocation, and downstream data sending.

In this embodiment of this application, a downstream transmitter, a first upstream burst receiver, and a second upstream burst receiver are disposed in the OLT 110. The OLT 110 sends downstream data to the ONU 120 by using the downstream transmitter (a downstream channel in the ODN 130), and receives, by using the first upstream burst receiver and the second upstream burst receiver, upstream data sent by the ONU 120 in bursts.

The ODN 130 is used to provide an optical transmission channel between the OLT 110 and each ONU 120. Specifically, the ODN 130 includes an optical fiber 131 and a power splitter 132.

In this embodiment of this application, the PON system includes a downstream channel, a first upstream channel, and a second upstream channel, and the downstream channel, the first upstream channel, and the second upstream channel are used as logical channels in the ODN 130, and share the ODN 130 in a wavelength division multiplexing manner. In addition, to prevent channels from affecting each other, a wavelength of the downstream channel is $\lambda_1$, a wavelength of the first upstream channel is $\lambda_2$, and a wavelength of the second upstream channel is $\lambda_3$, where $\lambda_2 \neq \lambda_3$.

The ONU 120 is a user end device in the PON system, and has functions such as registration responding, bandwidth allocation requesting, and downstream data receiving.

In this embodiment of this application, a downstream receiver, a first upstream burst transmitter, and a second upstream burst transmitter are disposed in each ONU 120. The ONU 120 receives, on the downstream channel by using the downstream receiver, downstream data sent by the OLT 110, sends upstream data on the first upstream channel in bursts by using the first upstream burst transmitter, and sends upstream data on the second upstream channel in bursts by using the second upstream burst transmitter.

It should be noted that the PON system shown in FIG. 1 may be an EPON system or a GPON system. This is not limited in this embodiment of this application.

Figure 2:
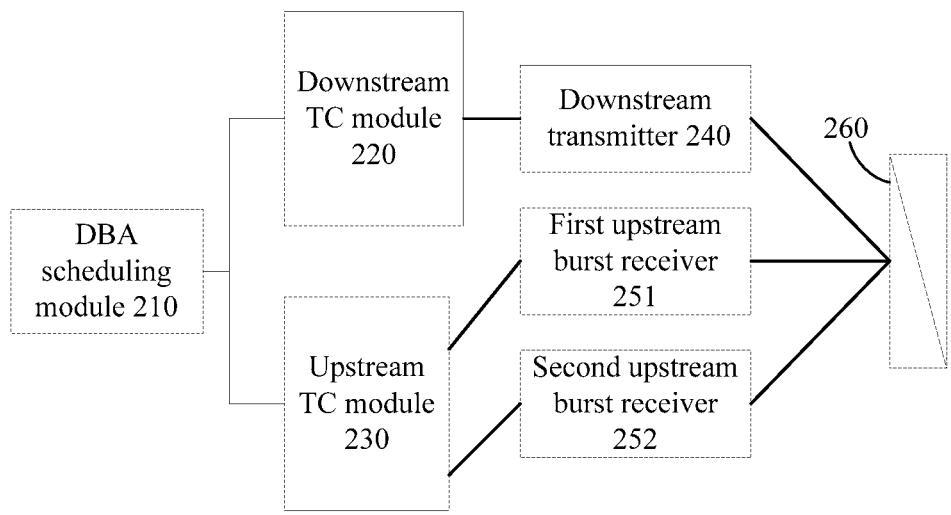
FIG. 2 is a schematic structural diagram of an OLT according to a first embodiment of this application.

FIG. 2 is a schematic structural diagram of an OLT according to an embodiment of this application. In this embodiment, an example in which the OLT is used in the PON system shown in FIG. 1 is used for description. The OLT includes: at least one DBA scheduling module 210, a downstream TC module 220, an upstream TC module 230, a downstream transmitter 240, a first upstream burst receiver 251, and a second upstream burst receiver 252.

The DBA scheduling module 210 has a scheduling control function, and is configured to: generate an upstream bandwidth grant and control, by using the upstream bandwidth grant, each ONU to send upstream data on a first upstream channel and a second upstream channel. Specifically, a first upstream bandwidth grant generated by the DBA scheduling module 210 is used to control the ONU to send the upstream data on the first upstream channel, and a second upstream bandwidth grant generated by the DBA scheduling module 210 is used to control the ONU to send the upstream data on the second upstream channel.

It should be noted that in different PON systems, messages used to carry the upstream bandwidth grant generated by the DBA scheduling module 210 are also different. Optionally, when the OLT is used in a GPON system, a BWmap message is used to carry the upstream bandwidth grant; or when the OLT is used in an EPON system, a Gate message is used to carry the upstream bandwidth grant. In this embodiment of this application, a specific type of a message carrying the upstream bandwidth grant is not limited.

The downstream TC module 220 is connected to each DBA scheduling module 210, and is configured to: obtain the upstream bandwidth grant generated by each DBA scheduling module 210, and generate, through downstream framing and convergence, downstream data including the upstream bandwidth grant. The downstream data further includes downstream service data that the ONU requests to obtain, for example, video data and voice data that the ONU requests to obtain.

Optionally, after completing upper-layer service adaptation, GPON encapsulation mode (GEM) encapsulation, TC framing, and physical layer adaptation, the downstream TC module 220 generates the downstream data. Upper-layer service adaptation includes user data adaptation, optical network unit management and control interface (OMCI) adaptation, and the like.

Optionally, both the upstream bandwidth grants corresponding to the first upstream channel and the second upstream channel are sent to the ONU on a same downstream channel. Correspondingly, after receiving the upstream bandwidth grant, the ONU needs to further determine an upstream channel corresponding to the upstream bandwidth grant, to send upstream data on the corresponding upstream channel based on the identified upstream bandwidth grant. Therefore, the upstream bandwidth grant includes an upstream channel identifier, so that the ONU can identify the received upstream bandwidth grant based on the upstream channel identifier.

The downstream transmitter 240 is connected to the downstream TC module 220, and is configured to send the downstream data generated by the downstream TC module 220 to each ONU on a downstream channel.

The downstream transmitter 240 sends the downstream data to each ONU in the PON system in a broadcast manner, and the downstream data is transmitted on the downstream channel in a form of an optical carrier signal.

The OLT may complete sending of the downstream data by using the DBA scheduling module 210, the downstream TC module 220, and the downstream transmitter 240. The ONU receiving the downstream data transmits upstream data on the first upstream channel or the second upstream channel based on the upstream bandwidth grant included in the downstream data.

In a possible design, that the ONU sends the upstream data on the upstream channel includes the following cases:

1: when the ONU is unregistered, sending a registration response packet on the second upstream channel;

2: when the ONU is registered, sending upstream service data (upstream service data of a low-delay service and upstream service data of a high-delay service are all sent on the first upstream channel) on the first upstream channel;

3: when the ONU is registered and the system includes no unregistered ONU, sending upstream service data of a low-delay service on the first upstream channel and sending upstream service data of a high-delay service on the second upstream channel; and 4: when the ONU is registered and the system includes an unregistered ONU, sending upstream service data of a low-delay service only on the first upstream channel.

As shown in FIG. 2, the upstream TC module 230 of the OLT is connected to the first upstream burst receiver 251 and the second upstream burst receiver 252, so that the first upstream burst receiver 251 is used to receive upstream data transmitted by the ONU on the first upstream channel, and the second upstream burst receiver 252 is used to receive upstream data transmitted by the ONU on the second upstream channel. The upstream data is transmitted on the first upstream channel and the second upstream channel in a form of an optical carrier signal.

In this embodiment of this application, a registration function is disabled on the first upstream channel, the registration function is enabled on the second upstream channel, and enabling and disabling of the registration function on the first upstream channel and the second upstream channel are controlled by the DBA scheduling module 210.

When the registration function is disabled on the first upstream channel, and the registration function is enabled on the second upstream channel, an unregistered ONU in the PON system sends a registration response packet only on the second upstream channel. Correspondingly, the OLT can receive the registration response packet on the second upstream channel only by using the second upstream burst receiver 262, and register the unregistered ONU based on the registration response packet.

Obviously, while an unregistered ONU in the PON system sends the registration response packet to the OLT on the second upstream channel, a registered ONU in the system can still send upstream service data to the OLT on the first upstream channel, and the upstream service data and the registration response packet on the different upstream channels do not conflict with each other.

It is easily understood that the ONU may transmit, on the first upstream channel, upstream service data corresponding to a low-delay service (a service having a relatively high delay requirement), and transmit, on the second upstream channel, a registration response packet and/or upstream service data corresponding to a high-delay service (a service having a relatively low delay requirement), to ensure that the system satisfies the delay requirement of the low-delay service while ensuring normal registration of the unregistered ONU.

It should be noted that because the downstream channel, the first upstream channel, and the second upstream channel share one ODN in a wavelength division multiplexing manner, and wavelengths of the first upstream channel and the second upstream channel are different, a wavelength multiplexer/demultiplexer 260 is further disposed in the OLT, and is configured to combine or split an optical carrier signal on the upstream and downstream channels.

Figure 3:
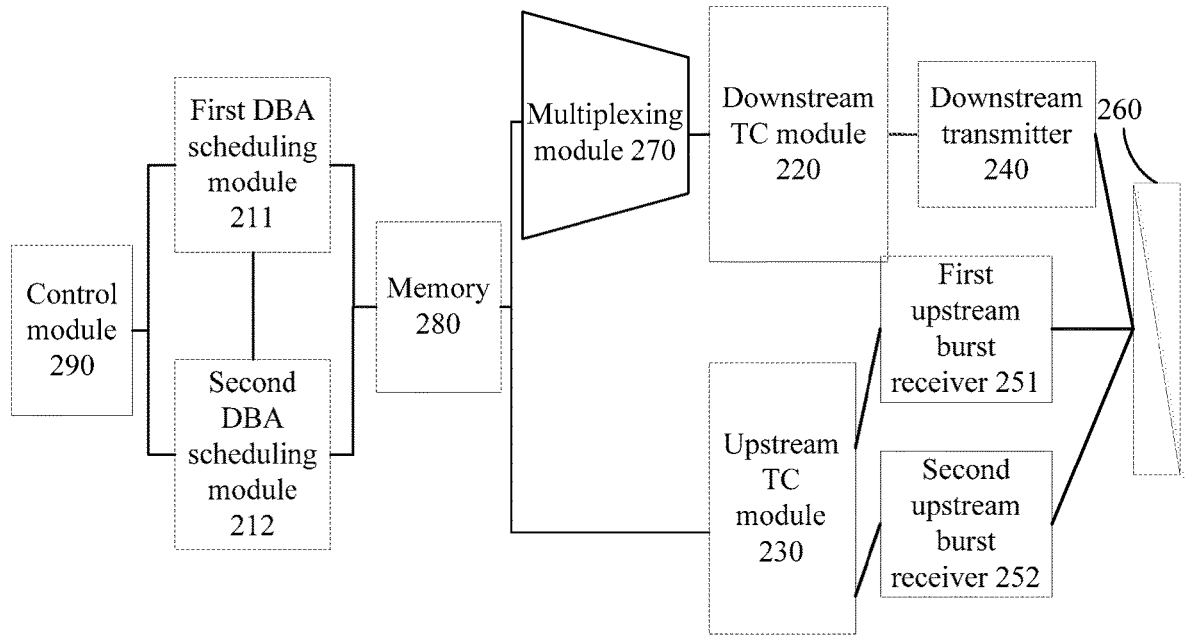
FIG. 3 is a schematic structural diagram of an OLT according to a second embodiment of this application.

In a possible implementation, two DBA scheduling modules are disposed in the OLT, and the OLT separately controls sending of upstream data on the first upstream channel and the second upstream channel by using the two DBA scheduling modules. Based on the OLT shown in FIG. 2, as shown in FIG. 3, the OLT includes a first DBA scheduling module 211, a second DBA scheduling module 212, and a multiplexing module 270.

The first DBA scheduling module 211 is configured to generate the first upstream bandwidth grant, and the first upstream bandwidth grant is used to control sending of upstream data on the first upstream channel. The second DBA scheduling module 212 is configured to generate the second upstream bandwidth grant, and the second upstream bandwidth grant is used to control sending of upstream data on the second upstream channel.

Optionally, to implement load balancing of the first upstream channel and the second upstream channel, the first DBA scheduling module 211 is connected to the second DBA scheduling module 212. When the upstream bandwidth grant is generated, the first DBA scheduling module 211 and the second DBA scheduling module 212 exchange information through the connection, to implement upstream bandwidth scheduling optimization. This is not limited in this embodiment of this application.

The multiplexing module 270 is connected to the first DBA scheduling module 211 and the second scheduling module 212, and is configured to: obtain the first upstream bandwidth grant and the second upstream bandwidth grant and multiplex the upstream bandwidth grants, to finally generate the multiplexed upstream bandwidth grant.

Because the first upstream bandwidth grant and the second upstream bandwidth grant are sent to the ONU on the same downstream channel after being multiplexed, after obtaining the first upstream bandwidth grant and the second upstream bandwidth grant, the multiplexing module 270 needs to add corresponding upstream channel identifiers to the upstream bandwidth grants, and then multiplexes the upstream bandwidth grants to which the upstream channel identifiers are added. In this way, the ONU can identify the first upstream bandwidth grant and the second upstream bandwidth grant, and determine upstream channels corresponding to different upstream bandwidth grants. Optionally, the upstream channel identifier may alternatively be generated by the DBA scheduling module, that is, the DBA scheduling module directly generates the upstream bandwidth grant carrying the upstream channel identifier. This is not limited in this embodiment of this application.

In a possible implementation, when the OLT is used in a GPON system, the multiplexing module 270 separately adds an upstream channel identifier to a first BWmap message (generated by the first DBA scheduling module) and a second BWmap message (generated by the second DBA scheduling module).

Specifically, because a start time field and a grant size field in the BWmap message are both 16-bit, but an actual value range is from 0 to 9719 (including 0 and 9719), that is, only 14 bits are used, the multiplexing module 270 may identify, by using one most significant bit or two most significant bits of the start time field and the grant size field, an upstream channel corresponding to the BWmap message. For example, when the one most significant bit is 0, it indicates that the BWmap message corresponds to the first upstream channel, and when the one most significant bit is 1, it indicates that the BWmap message corresponds to the second upstream channel. Alternatively, when the two most significant bits are 00, it indicates that the BWmap message corresponds to the first upstream channel, and when the two most significant bits are 11, it indicates that the BWmap message corresponds to the second upstream channel.

In another possible implementation, when the OLT is used in an EPON system, the multiplexing module (or the DBA scheduling module) newly adds a channel identifier field to a Gate message to indicate an upstream channel corresponding to the Gate message. For example, a channel identifier field CH_Num is newly added to the Gate message, when CH_Num is 0x00, it indicates that the Gate message corresponds to the first upstream channel, and when CH_Num is 0x01, it indicates that the Gate message corresponds to the second upstream channel.

Optionally, when the OLT is used in the EPON system, the upstream channel corresponding to the Gate message may alternatively be identified by using different operation codes (Opcode). For example, when operation code of the Gate message is 0xaa, it indicates that the Gate message corresponds to the first upstream channel, and when the operation code of the Gate message is 0xbb, it indicates that the Gate message corresponds to the second upstream channel.

After the upstream channel identifiers are added to the first upstream bandwidth grant and the second upstream bandwidth grant, the multiplexing module 270 converges and multiplexes the first upstream bandwidth grant and the second upstream bandwidth grant, to obtain the multiplexed upstream bandwidth grant.

The multiplexing module 270 is further connected to the downstream TC module 220, and is configured to provide the multiplexed upstream bandwidth grant for the downstream TC module 220. The downstream TC module 220 sends, on the downstream channel by using the downstream transmitter 240, the downstream data including the upstream bandwidth grant.

Optionally, the multiplexing module 270 is further connected to the upstream TC module 230, and is configured to provide the multiplexed upstream bandwidth grant for the upstream TC module 230. Correspondingly, based on the upstream bandwidth grant, the upstream TC module 230 controls the first upstream burst receiver 251 to receive the upstream data transmitted by the ONU on the first upstream channel, and controls the second upstream burst receiver 252 to receive the upstream data transmitted by the ONU on the second upstream channel.

The upstream data is sent on the first upstream channel and the second upstream channel in bursts. Therefore, optionally, as shown in FIG. 3, the OLT further includes a memory 280, so that the OLT learns of an arriving time of the upstream data, and the upstream burst receiver of the OLT makes preparations for receiving data before the upstream data arrives. The memory 280 is connected to each DBA scheduling module, and the memory 280 is further connected to the multiplexing module 270 and the upstream TC module 230.

After obtaining the upstream bandwidth grant generated by each DBA scheduling module, the memory 280 makes two copies of the upstream bandwidth grant. One copy is sent to the multiplexing module 270. The multiplexing module 270 multiplexes the upstream bandwidth grants, and then transmits the multiplexed upstream bandwidth grant to the downstream TC module 220. The downstream TC module 220 generates, through downstream framing and convergence, the downstream data including the upstream bandwidth grant, and finally sends the downstream data to the ONU. The other copy is stored and sent to the upstream TC module 230. Based on the upstream bandwidth grant, the upstream TC module 230 controls the first upstream burst receiver 251 to receive the upstream data sent by the ONU in bursts on the first upstream channel, and controls the second upstream burst receiver 252 to receive the upstream data sent by the ONU in bursts on the second upstream channel.

Optionally, after obtaining the upstream bandwidth grant, before the upstream data arrives, the upstream TC module 230 separately resets the first upstream burst receiver 251 and the second upstream burst receiver 252, to instruct the first upstream burst receiver 251 to start to receive the upstream data transmitted by the ONU on the first upstream channel, and instruct the second upstream burst receiver 252 to start to receive the upstream data transmitted by the ONU on the second upstream channel.

Further, the upstream TC module 230 may further identify, based on the upstream bandwidth grant, an ONU that transmits upstream data on the first upstream channel and an ONU that transmits upstream data on the second upstream channel, to further forward the upstream data.

Further, the upstream TC module 230 may further perform, based on the upstream bandwidth grant, authentication on the upstream data sent by the ONU, to determine whether the PON system has an ONU that performs unauthorized access. For example, if detecting upstream data outside an upstream sending timeslot indicated by the upstream bandwidth grant, the upstream TC module 230 determines that the PON system has an ONU that performs unauthorized access. For another example, after receiving upstream data, the upstream TC module 230 searches the upstream bandwidth grant for a corresponding ONU identifier based on an upstream sending timeslot in which a sending party (an ONU sending the upstream data) sends the upstream data, and if a found ONU identifier is inconsistent with an ONU identifier of the sending party, determines that the PON system has an ONU that performs unauthorized access. The ONU identifier is an LLID or an ONU ID allocated by the OLT. For upstream data that fails to be authenticated, the OLT directly filters the upstream data, and for upstream data that has been authenticated, the OLT further parses the upstream data to obtain service information included in the upstream data.

In another possible implementation, the multiplexing module 270 may be further connected to the first DBA scheduling module 211 and the second DBA scheduling module 212, and provide the multiplexed upstream bandwidth grant for the memory 280 connected to the multiplexing module 270. The memory 280 separately provides the multiplexed upstream bandwidth grant for the downstream TC module 220 and the upstream TC module 230 connected to the memory 280. A connection sequence of the multiplexing module and the memory is not limited in this embodiment of this application.

In this embodiment, the memory is used to provide the upstream bandwidth grant for the upstream TC module, so that the upstream TC module can control, based on the upstream bandwidth grant, the upstream burst receiver to receive the upstream data. Therefore, the upstream data is received more accurately. In addition, the upstream TC module may further perform authentication on the received upstream data by using the upstream bandwidth grant, to prevent an ONU that performs unauthorized access from affecting the PON system.

In the OLT shown in FIG. 3, when the first DBA scheduling module 211 is configured to disable the registration function, and the second DBA scheduling module 212 is configured to enable the registration function, a newly added ONU can be registered only on the second upstream channel corresponding to the second DBA scheduling module 212. To flexibly configure the registration function, as shown in FIG. 3, the OLT further includes a control module 290.

The control module 290 is connected to the first DBA scheduling module 211 and the second DBA scheduling module 212, and is configured to control one of the first DBA scheduling module 211 and the second DBA scheduling module 212 to enable the registration function, to control enabling and disabling of the registration function on a corresponding upstream channel.

Optionally, according to a received configuration command, the control module 290 configures enabling and disabling of the registration function by the first DBA scheduling module 211 and the second DBA scheduling module 212. The configuration command is inputted by an external device connected to the OLT.

Optionally, the control module 290 obtains channel transmission quality of the first upstream channel and the second upstream channel at predetermined intervals, when the channel transmission quality of the first upstream channel is better than the channel transmission quality of the second upstream channel, controls the first DBA scheduling module 211 to disable the registration function and controls the second DBA scheduling module 212 to enable the registration function; and when the channel transmission quality of the second upstream channel is better than the channel transmission quality of the first upstream channel, controls the first DBA scheduling module 211 to enable the registration function and controls the second DBA scheduling module 212 to disable the registration function. In this embodiment of this application, only an example in which the control module 290 controls the first DBA scheduling module 211 to disable the registration function and controls the second DBA scheduling module 212 to enable the registration function is used for description, and constitutes no limitation on this application.

The first upstream bandwidth grant generated by the first DBA scheduling module that disables the registration function includes an upstream sending timeslot, and a registered ONU in the PON system sends upstream service data on the first upstream channel based on the upstream sending timeslot. The second upstream bandwidth grant generated by the second DBA scheduling module that enables the registration function includes a registration timeslot, and an unregistered ONU in the PON system sends a registration response packet on the second upstream channel based on the registration timeslot. Finally, the OLT completes registration and activation for the unregistered ONU based on the registration response packet.

Optionally, in the OLT shown in FIG. 3, the first upstream channel is configured to transmit only upstream service data, and the second upstream channel is configured to transmit only a registration response packet. To be specific, all upstream service data in the PON system is transmitted on the first upstream channel, and all registration response packets in the system are transmitted on the second upstream channel.

The first DBA scheduling module 211 is configured to generate the first upstream bandwidth grant including an upstream sending timeslot.

The upstream sending timeslot is used to instruct a registered ONU in the PON system to send upstream service data on the first upstream channel, and upstream sending timeslots corresponding to different ONUs are different. For a manner of specifying the upstream sending timeslot, refer to the GPON family of standards and/or the EPON family of standards. This is not limited in this embodiment of this application.

Optionally, the first upstream bandwidth grant includes a correspondence between an ONU identifier and an upstream sending timeslot. The ONU searches for a corresponding upstream sending timeslot based on an ONU identifier of the ONU, and sends upstream service data in bursts in a time period indicated by the upstream sending timeslot.

The second DBA scheduling module 212 is configured to generate the second upstream bandwidth grant including a registration timeslot.

The registration timeslot is used to instruct an unregistered ONU in the PON system to send a registration response packet on the second upstream channel. The unregistered ONU receives the second upstream bandwidth grant on the downstream channel, and when detecting that the second upstream bandwidth grant includes the registration timeslot, sends the registration response packet in a time period indicated by the registration timeslot.

Obviously, in a registration period (that is, a quiet zone), the unregistered ONU sends the registration response packet on the second upstream channel, and the registered ONU sends the upstream service data on the first upstream channel. Therefore, there is no conflict between the registration response packet and the upstream service data. In a non-registration period, the registered ONU sends the upstream service data on the first upstream channel, and the second upstream channel is in a disabled state. In this case, the second upstream burst receiver of the OLT and a second upstream burst transmitter of the ONU both stop working, to dynamically perform energy conservation of the PON system.

Optionally, in the OLT shown in FIG. 3, the first upstream channel is configured to transmit only first upstream service data, and the second upstream channel is configured to transmit a registration response packet and second upstream service data.

The first DBA scheduling module 211 is configured to generate the first upstream bandwidth grant including a first upstream sending timeslot.

The second DBA scheduling module 212 is configured to generate the second upstream bandwidth grant including a second upstream sending timeslot and a registration timeslot.

The first upstream sending timeslot is used to instruct a registered ONU to send the first upstream service data on the first upstream channel, the second upstream sending timeslot is used to instruct the registered ONU to send the second upstream service data on the second upstream channel, the registration timeslot is used to instruct an unregistered ONU to send the registration response packet on the second upstream channel, and a delay requirement of the first upstream service data is higher than a delay requirement of the second upstream service data.

Optionally, a delay of the first upstream service data is less than that of the second upstream service data. To be specific, the ONU sends, on the first upstream channel, upstream service data corresponding to a low-delay service, and registers a newly added ONU and sends, on the second upstream channel, upstream service data corresponding to a high-delay service.

It should be noted that when the unregistered ONU sends the registration response packet based on the registration timeslot in the second upstream bandwidth grant, the registered ONU needs to stop sending the second upstream service data on the second upstream channel, to prevent the second upstream service data from conflicting with the registration response packet on the second upstream channel.

Obviously, in this embodiment, the PON system can send the upstream service data on the two upstream channels while ensuring that the low-delay service is not affected by an ONU registration process, thereby increasing a transmission rate of the upstream service data in the entire PON system.

Figure 4:
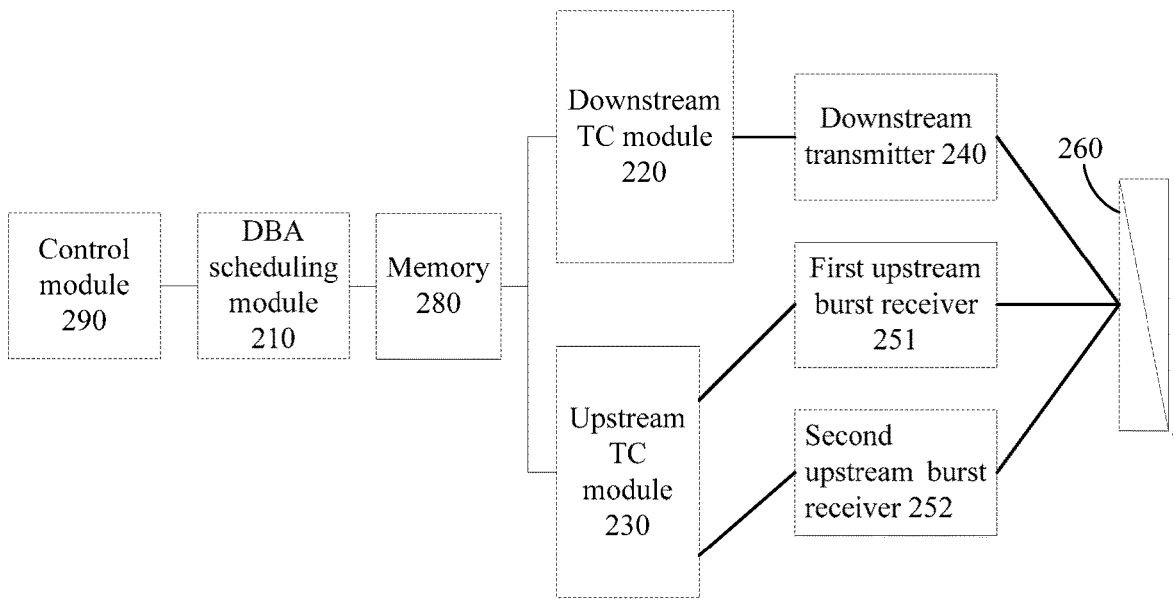
FIG. 4 is a schematic structural diagram of an OLT according to a third embodiment of this application.

In the foregoing embodiment, an example in which two DBA scheduling modules are disposed in the OLT is used for description. In another possible implementation, only one DBA scheduling module may be disposed in the OLT, and the OLT controls sending of the upstream data on the first upstream channel and the second upstream channel by using the DBA scheduling modules. Based on the OLT shown in FIG. 2, as shown in FIG. 4, the OLT includes a DBA scheduling module 210 and a control module 290.

The control module 290 is connected to the DBA scheduling module 210, and is configured to control the DBA scheduling module 210 to enable or disable a registration function.

Optionally, the control module 290 controls, at predetermined intervals, the DBA scheduling module 210 to enable the registration function, and when duration of enabling the registration function reaches preset duration, controls the DBA scheduling module 210 to disable the registration function.

When enabling the registration function, the DBA scheduling module 210 generates a first upstream bandwidth grant including a first upstream sending timeslot and a second upstream bandwidth grant including a registration timeslot.

Correspondingly, after each ONU in the PON system receives the first upstream bandwidth grant and the second upstream bandwidth grant, a registered ONU sends first upstream service data on the first upstream channel based on the first upstream sending timeslot included in the first upstream bandwidth grant; and an unregistered ONU sends a registration response packet and completes registration and activation on the second upstream channel based on the registration timeslot included in the second upstream bandwidth grant.

When the registration function is disabled and the second upstream channel is configured to transmit only the registration response packet, the DBA scheduling module 210 generates the first upstream bandwidth grant including the first upstream sending timeslot, to instruct a registered ONU in the system to send upstream service data on the first upstream channel.

When the registration function is disabled, and the second upstream channel is configured to transmit the registration response packet and second upstream service data, the DBA scheduling module 210 generates the first upstream bandwidth grant including the first upstream sending timeslot and the second upstream bandwidth grant including a second upstream sending timeslot, to instruct the registered ONU in the system to send the first upstream service data on the first upstream channel and send the second upstream service data on the second upstream channel.

Upstream data is sent on the first upstream channel and the second upstream channel in bursts. Therefore, optionally, as shown in FIG. 4, the OLT further includes a memory 280, so that the OLT learns of an arriving time of the upstream data, and the upstream burst receiver of the OLT makes preparations for receiving data before the upstream data arrives. The memory 280 is connected to the DBA scheduling module 210, and the memory 280 is further connected to the downstream TC module 220 and the upstream TC module 230.

After obtaining the upstream bandwidth grant generated by the DBA scheduling module 210, the memory 280 makes two copies of the upstream bandwidth grant. One copy is sent to the downstream TC module 220. The downstream TC module 220 generates, through downstream framing and convergence, downstream data including the upstream bandwidth grant, and finally sends the downstream data to the ONU. The other copy is stored and sent to the upstream TC module 230. Based on the upstream bandwidth grant, the upstream TC module 230 controls the first upstream burst receiver 251 to receive the upstream data sent by the ONU in bursts on the first upstream channel, and controls the second upstream burst receiver 252 to receive the upstream data sent by the ONU in bursts on the second upstream channel.

Optionally, after obtaining the upstream bandwidth grant, before the upstream data arrives, the upstream TC module 230 separately resets the first upstream burst receiver 251 and the second upstream burst receiver 252, to instruct the first upstream burst receiver 251 to start to receive the upstream data transmitted by the ONU on the first upstream channel, and instruct the second upstream burst receiver 252 to start to receive the upstream data transmitted by the ONU on the second upstream channel.

Further, the upstream TC module 230 may further identify, based on the upstream bandwidth grant, an ONU that transmits upstream data on the first upstream channel and an ONU that transmits upstream data on the second upstream channel, to further forward the upstream data.

Further, the upstream TC module 230 may further perform, based on the upstream bandwidth grant, authentication on the upstream data sent by the ONU, to determine whether the PON system has an ONU that performs unauthorized access. For example, if detecting upstream data outside an upstream sending timeslot indicated by the upstream bandwidth grant, the upstream TC module 230 determines that the PON system has an ONU that performs unauthorized access. For another example, after receiving upstream data, the upstream TC module 230 searches the upstream bandwidth grant for a corresponding ONU identifier based on an upstream sending timeslot in which a sending party (an ONU sending the upstream data) sends the upstream data, and if a found ONU identifier is inconsistent with an ONU identifier of the sending party, determines that the PON system has an ONU that performs unauthorized access. The ONU identifier is an LLID or an ONU ID allocated by the OLT. For upstream data that fails to be authenticated, the OLT directly filters the upstream data, and for upstream data that has been authenticated, the OLT further parses the upstream data to obtain service information included in the upstream data.

In this embodiment, the memory is used to provide the upstream bandwidth grant for the upstream TC module, so that the upstream TC module can control, based on the upstream bandwidth grant, the upstream burst receiver to receive the upstream data. Therefore, the upstream data is received more accurately. In addition, the upstream TC module may further perform authentication on the received upstream data by using the upstream bandwidth grant, to prevent an ONU that performs unauthorized access from affecting the PON system.

Figure 5:
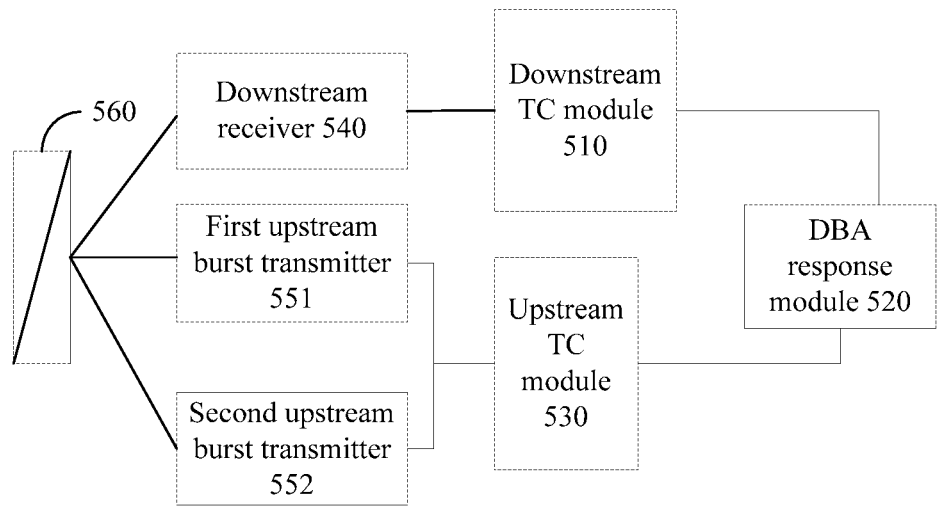
FIG. 5 is a schematic structural diagram of an ONU according to a first embodiment of this application.

FIG. 5 is a schematic structural diagram of an ONU according to an embodiment of this application. In this embodiment, an example in which the ONU is used in the PON system shown in FIG. 1 is used for description. The ONU includes: a downstream TC module 510, at least one DBA response module 520, an upstream TC module 530, a downstream receiver 540, a first upstream burst transmitter 551, and a second upstream burst transmitter 552.

The downstream receiver 540 is configured to receive, on a downstream channel, downstream data sent by an OLT (in a broadcast manner). The downstream data is transmitted on the downstream channel in a form of an optical carrier signal.

The downstream data includes an upstream bandwidth grant used to control the ONU to send upstream data. Optionally, when the ONU is used in a GPON system, a BWmap message sent by the OLT carries the upstream bandwidth grant; or when the ONU is used in an EPON system, a Gate message sent by the OLT carries the upstream bandwidth grant.

Optionally, the downstream data further includes downstream service data that the ONU requests to obtain, for example, video data and voice data that the ONU requests to obtain.

After obtaining the downstream data, the downstream receiver 540 provides the downstream data for the downstream TC module 510 connected to the downstream receiver 540.

In a possible implementation, after obtaining the downstream data, the downstream TC module 510 recovers the upstream bandwidth grant and downstream service data included in the downstream data, provides the downstream service data for a terminal device connected to the downstream TC module 510, and provides the identified upstream bandwidth grant for the DBA response module 520 connected to the downstream TC module 510.

The DBA response module 520 corresponds to the DBA scheduling module of the OLT in the foregoing embodiment, and is configured to control, based on the obtained upstream bandwidth grant, the ONU to send upstream data on an upstream channel.

As shown in FIG. 5, the DBA response module 520 is further connected to the upstream TC module 530, and is configured to control, based on an upstream bandwidth grant included in the downstream data, the upstream TC module 530 to send upstream data.

Different from the prior art in which the ONU sends upstream data only on one upstream channel, in this embodiment, the ONU sends upstream data to the OLT on two upstream channels.

Optionally, the downstream data includes a first upstream bandwidth grant and a second upstream bandwidth grant. The DBA response module 520 controls, based on the first upstream bandwidth grant, the upstream TC module 530 to send the upstream data on a first upstream channel, and controls, based on the second upstream bandwidth grant, the upstream TC module 530 to send the upstream data on a second upstream channel.

Optionally, the upstream TC module 530 is further configured to receive an upstream bandwidth request sent by each DBA response module 520, and reports the upstream bandwidth request on an upstream channel corresponding to the DBA response module 520. The upstream bandwidth request is obtained by the DBA response module 520 by collecting statistics on data packets in a sending queue.

To send upstream data on two channels, the upstream TC module 530 is connected to the first upstream burst transmitter 551 and the second upstream burst transmitter 552, sends upstream data on the first upstream channel by using the first upstream burst transmitter 551, and sends upstream data on the second upstream channel by using the second upstream burst transmitter 552.

Optionally, when the upstream TC module 530 needs to send upstream data on the first upstream channel, the upstream TC module 530 sends an enabling signal to the first upstream burst transmitter 551 corresponding to the first upstream channel, to trigger the first upstream burst transmitter 551 to send the upstream data. When the upstream TC module 530 needs to send upstream data on the second upstream channel, the upstream TC module 530 sends an enabling signal to the second upstream burst transmitter 552 corresponding to the second upstream channel, to trigger the second upstream burst transmitter 552 to send the upstream data.

In this embodiment, a registration function is disabled on the first upstream channel, the registration function is enabled on the second upstream channel, and enabling and disabling of the registration function on the first upstream channel and the second upstream channel are controlled by the OLT.

A registration response packet can be transmitted only on an upstream channel on which the registration function is enabled, and different upstream channels do not conflict with each other. Therefore, optionally, the ONU selects the first upstream channel on which the registration function is disabled, to transmit upstream service data, and selects the second upstream channel on which the registration function is enabled, to transmit the registration response packet. Alternatively, based on a service delay requirement, the ONU selects the first upstream channel on which the registration function is disabled, to transmit upstream service data corresponding to a low-delay service (a service with a relatively high delay requirement), and selects the second upstream channel on which the registration function is enabled, to transmit the registration response packet and upstream service data corresponding to a high-delay service (a service having a relatively low delay requirement).

Obviously, two upstream channels are configured, and it is configured that the registration function is disabled on the first upstream channel and the registration function is enabled on the second upstream channel, so that when an unregistered ONU in the PON system sends the registration response packet on the second upstream channel, a registered ONU can still send upstream service data on the first upstream channel, to prevent ONU registration from affecting sending of upstream data of a service and satisfy a system delay requirement of a low-delay service.

It should be noted that because the downstream channel, the first upstream channel, and the second upstream channel share one ODN in a wavelength division multiplexing manner, and wavelengths of the first upstream channel and the second upstream channel are different, a wavelength multiplexer/demultiplexer 560 is further disposed in the ONU, and is configured to combine or split an optical carrier signal on the upstream and downstream channels.

Figure 6:
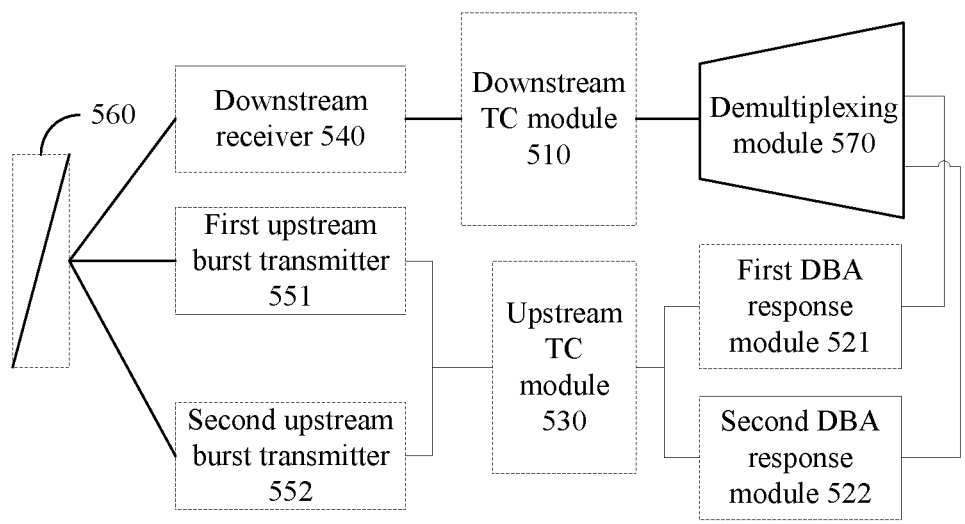
FIG. 6 is a schematic structural diagram of an ONU according to a second embodiment of this application.

In a possible implementation, the upstream bandwidth grant sent by the OLT on the downstream channel is obtained by multiplexing the first upstream bandwidth grant and the second upstream bandwidth grant. Correspondingly, after receiving the upstream bandwidth grant, the ONU needs to demultiplex the upstream bandwidth grant, and send upstream data on a corresponding upstream channel based on the first upstream bandwidth grant and the second upstream bandwidth grant obtained by demultiplexing. Based on the ONU shown in FIG. 5, as shown in FIG. 6, the ONU includes a first DBA response module 521, a second DBA response module 522, and a demultiplexing module 570.

The demultiplexing module 570 corresponds to the multiplexing module of the OLT in the foregoing embodiment, and is configured to: obtain the upstream bandwidth grant received by the downstream TC module 510, and demultiplex the upstream bandwidth grant to obtain the first upstream bandwidth grant and the second upstream bandwidth grant.

Further, the demultiplexing module 570 is further connected to the first DBA response module 521 and the second DBA response module 522, and is configured to: provide the first upstream bandwidth grant obtained by demultiplexing for the first DBA response module 521, and provide the second upstream bandwidth grant obtained by demultiplexing for the second DBA response module 522.

Optionally, the demultiplexing module 570 obtains the first upstream bandwidth grant and the second upstream bandwidth grant by demultiplexing based on an upstream channel identifier included in the (multiplexed) upstream bandwidth grant. The first upstream bandwidth grant corresponds to an upstream channel identifier of a first upstream channel, and the second upstream bandwidth grant corresponds to an upstream channel identifier of a second upstream channel. Further, the demultiplexing module 570 sends the first upstream bandwidth grant and the second upstream bandwidth grant to corresponding DBA response modules.

As shown in FIG. 6, the first DBA response module 521 is connected to the demultiplexing module 570, and is configured to control, based on the first upstream bandwidth grant, the upstream TC module 530 to send the upstream data on the first upstream channel.

The second DBA response module 522 is connected to the demultiplexing module 570, and is configured to control, based on the second upstream bandwidth grant, the upstream TC module 530 to send the upstream data on the second upstream channel.

In a possible implementation, the first upstream channel on which a registration function is disabled is only used to transmit upstream service data, and the second upstream channel on which the registration function is enabled is only used to transmit a registration response packet.

For an ONU in a registered state in the PON system, the upstream TC module 530 of the ONU sends a first enabling signal to the first upstream burst transmitter 551 based on an upstream sending timeslot in the first upstream bandwidth grant, to trigger the first upstream burst transmitter 551 to send the upstream service data to the OLT on the first upstream channel.

For an ONU in an unregistered state in the PON system, the upstream TC module 530 of the ONU sends a second enabling signal to the second upstream burst transmitter 552 based on a registration timeslot in the second upstream bandwidth grant, to trigger the second upstream burst transmitter 552 to send the registration response packet to the OLT on the second upstream channel.

In other words, when the first upstream channel on which the registration function is disabled is only used to transmit upstream service data, and the second upstream channel on which the registration function is enabled is only used to transmit the registration response packet, registered ONUs in the PON system all send upstream service data to the OLT on the first upstream channel, and unregistered ONUs all send registration response packets to the OLT on the second upstream channel. The upstream service data and the registration response packets are transmitted on different upstream channels, to prevent an ONU registration process from affecting a process of sending the upstream service data.

In another possible implementation, the first upstream channel on which the registration function is disabled is used to transmit first upstream service data, and the second upstream channel on which the registration function is enabled is used to transmit the registration response packet and second upstream service data.

For an ONU in a registered state in the PON system, the upstream TC module 530 of the ONU sends a third enabling signal to the first upstream burst transmitter 551 based on a first upstream sending timeslot in the first upstream bandwidth grant, to trigger the first upstream burst transmitter 551 to send the first upstream service data on the first upstream channel. At the same time, the upstream TC module 530 sends a fourth enabling signal to the second upstream burst transmitter 552 based on a second upstream sending timeslot in the second upstream bandwidth grant, to trigger the second upstream burst transmitter 552 to send the second upstream service data on the second upstream channel. A delay requirement of the first upstream service data is higher than a delay requirement of the second upstream service data.

For an ONU in an unregistered state in the PON system, the upstream TC module 530 of the ONU sends a second enabling signal to the second upstream burst transmitter 552 based on a registration timeslot in the second upstream bandwidth grant, to trigger the second upstream burst transmitter 552 to send the registration response packet on the second upstream channel. It should be noted that when the unregistered ONU sends the registration response packet on the second upstream channel, a registered ONU needs to stop sending the second upstream service data on the second upstream channel, to prevent the registration response packet from conflicting with the second upstream service data on the second upstream channel. Simply, in this embodiment, the first upstream channel is used to transmit upstream service data of a low-delay service, and in addition to being used to perform ONU registration, the second upstream channel is further used to transmit upstream service data of a high-delay service. Therefore, two upstream channels are used to transmit upstream service data while it is ensured that ONU registration does not affect the low-delay service, thereby further increasing a transmission rate of the upstream service data in the PON system.

It should be noted that only an example in which the first DBA response module 521 and the second DBA response module 522 are connected to the same upstream TC module 530 is used for description in the foregoing embodiment. In another possible implementation, the upstream TC module 530 may be divided into two upstream TC submodules. The first DBA response module 521 and the second DBA response module 522 are connected to respective upstream TC submodules of the first DBA response module 521 and the second DBA response module 522, and send upstream data by using the upstream TC submodules. This is not limited in the embodiment.

Figure 7:
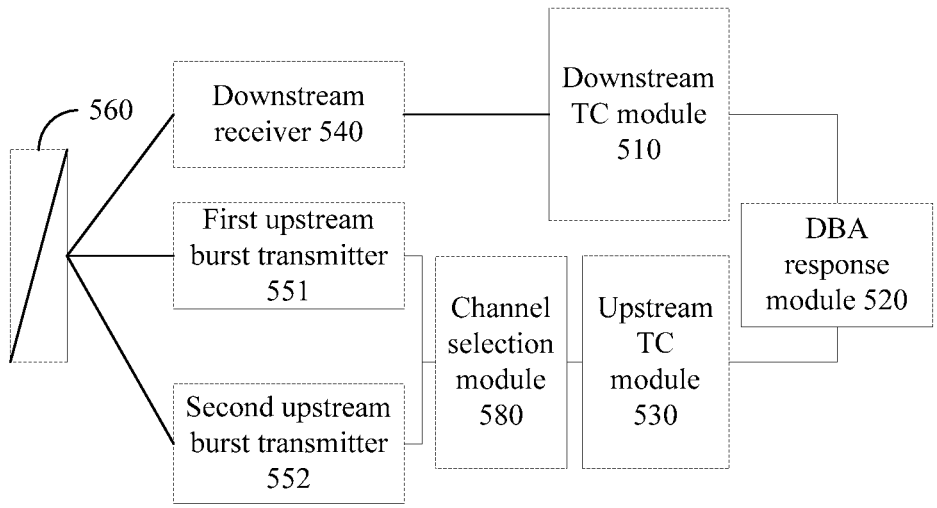
FIG. 7 is a schematic structural diagram of an ONU according to a third embodiment of this application.

In the foregoing embodiment, an example in which the ONU includes the two DBA response modules is used for description. In another possible implementation, based on the ONU shown in FIG. 5, as shown in FIG. 7, the ONU includes a DBA response module 520 and a channel selection module 580.

The DBA response module 520 is connected to the downstream TC module 510, and is configured to: control, based on a received first upstream bandwidth grant, the upstream TC module 530 to send upstream service data, or control, based on a received second upstream bandwidth grant, the upstream TC module 530 to send a registration response packet.

One end of the channel selection module 580 is connected to the upstream TC module 530, and the other end of the channel selection module 580 is connected to the first upstream burst transmitter 551 and the second upstream burst transmitter 552. After obtaining to-be-sent upstream data (the upstream service data or the registration response packet) by using the upstream TC module 530, the channel selection module 580 further determines, based on a registration status of the ONU, an upstream burst transmitter selected to send upstream data.

When the ONU is in a registered state, the channel selection module 580 selects the first upstream burst transmitter 551 to send the upstream service data generated by the upstream TC module 530 through framing and convergence, or when the ONU is in an unregistered state, the channel selection module 580 selects the second upstream burst transmitter 552 to send the registration response packet generated by the upstream TC module 530.

In this embodiment, based on a registration status of the ONU, when the ONU is in the registered state, the channel selection module of the ONU disables the second upstream burst transmitter (that is, disables the second upstream channel of the ONU) and sends the upstream service data on the first upstream channel by using the enabled first upstream burst transmitter; and when the ONU is in the unregistered state, disables the first upstream burst transmitter (that is, disables the first upstream channel of the ONU) and sends the registration response packet on the second upstream channel by using the enabled second upstream burst transmitter, to dynamically perform energy conservation of the ONU.

Figure 8:
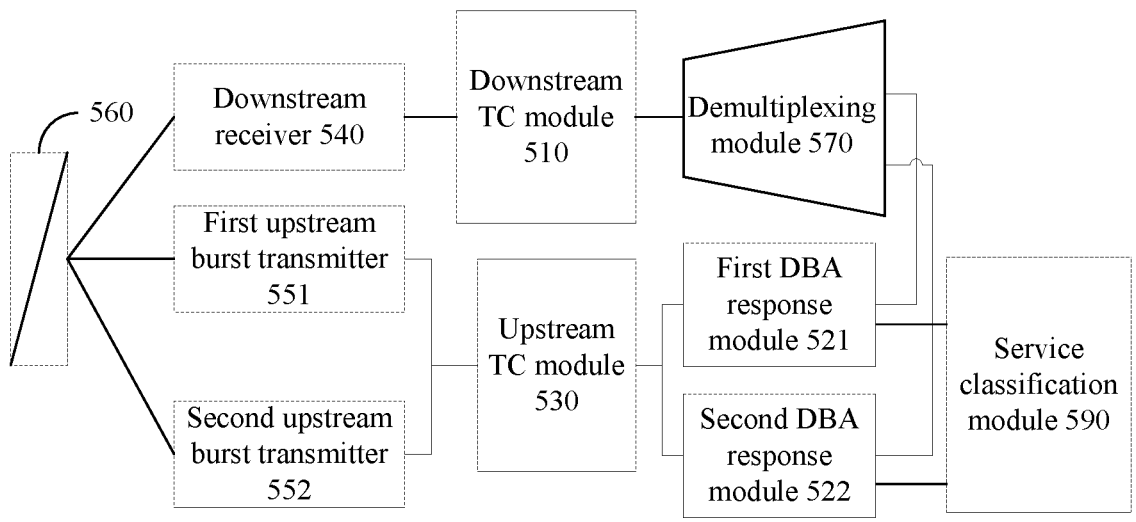
FIG. 8 is a schematic structural diagram of an ONU according to a fourth embodiment of this application.

When the ONU needs to simultaneously send upstream service data of a low-delay service and a high-delay service, to prevent ONU registration from affecting the low-delay service, the ONU needs to separate a data upstream process of the low-delay service from an ONU registration process. In a possible implementation, based on the ONU shown in FIG. 6, as shown in FIG. 8, the ONU further includes a service classification module 590.

The service classification module 590 classifies upper-layer services according to a preset classification criterion, and classifies upper-layer services into a first class and a second class. A delay requirement of a service belonging to the first class is higher than a delay requirement of a service belonging to the second class.

Optionally, the service classification module 590 is configured to: collect a delay requirement of each service and determine a service class of the service based on the delay requirement.

Further, the service classification module 590 selects, based on a service class to which each service belongs, a corresponding DBA response module (a corresponding upstream channel) to send upstream service data corresponding to the service.

Because a high-delay service is insensitive to a delay, that is, ONU registration does not affect the high-delay service, when a service class indicates that a service belongs to the first class (that is, the service is a low-delay service), the service classification module 590 transfers the service to the first DBA response module 521 for processing. The first DBA response module 521 controls the upstream TC module 530 to send, on a first upstream channel on which a registration function is disabled, first upstream service data corresponding to the service. When a service class indicates that a service belongs to the second class (that is, the service is a high-delay service), the service classification module 590 transfers the service to the second DBA response module 522 for processing. The second DBA response module 522 controls the upstream TC module 530 to send, on a second upstream channel on which the registration function is enabled, second upstream service data corresponding to the service.

Optionally, for upstream data sent on a same upstream channel, the ONU may further sort services based on service priorities, and preferentially send upstream data corresponding to a high-priority service. This is not limited in this embodiment.

In this embodiment, the ONU classifies services by using the service classification module, selects the first upstream channel on which the registration function is disabled, to send upstream data corresponding to a low-delay service, and selects the second upstream channel on which the registration function is enabled, to send upstream data corresponding to a high-delay service, to ensure that the low-delay service is not affected by ONU registration and satisfy a system delay requirement of the low-delay service.

Figure 9:
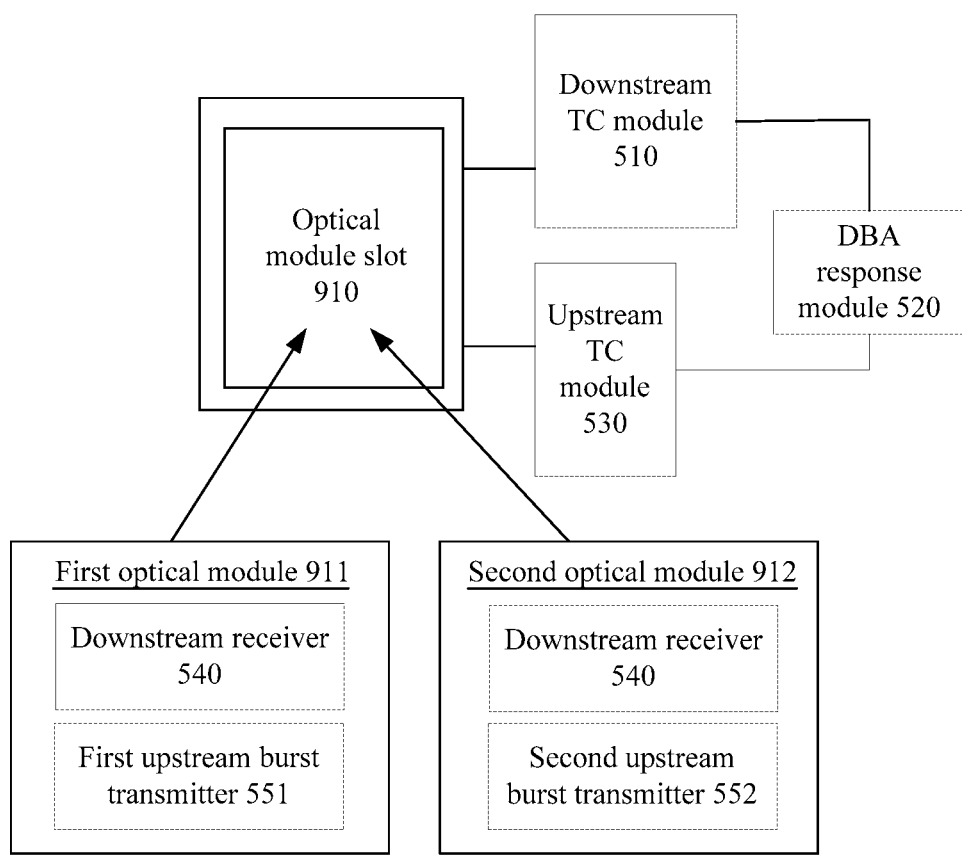
FIG. 9 is a schematic structural diagram of an ONU according to a fifth embodiment of this application.

In the ONU shown in FIG. 5 to FIG. 8, the first upstream burst transmitter 551 and the second upstream burst transmitter 552 are both fixedly disposed in the ONU. However, in an actual use process, the second upstream burst transmitter 552 works only when registration is performed or when the second upstream service data needs to be sent. As a result, utilization of the second upstream burst transmitter 552 is relatively low. To reduce manufacturing costs of the entire ONU, based on the ONU shown in FIG. 5, in a possible implementation, as shown in FIG. 9, the ONU includes an optical module slot 910. The optical module slot 910 is used for a first optical module 911 or a second optical module 912 to slot into.

The first optical module 911 includes at least the downstream receiver 540 and the first upstream burst transmitter 551, and the second optical module 912 includes at least the downstream receiver 540 and the second upstream burst receiver 551. To be specific, when the first optical module 911 is slot into the optical module slot 910, the first optical module 911 receives downstream data on a downstream channel by using the downstream receiver 540, and sends upstream data on a first upstream channel by using the first upstream burst transmitter 551. When the second optical module 912 is slot into the optical module slot 910, the second optical module 912 receives downstream data on the downstream channel, and sends upstream data on a second upstream channel by using the second upstream burst transmitter 552. Because a registration function is disabled on the first upstream channel and the registration function is enabled on the second upstream channel, in an unregistered ONU in the PON system, the second optical module 912 is slot into the optical module slot 910, so that after receiving, on the downstream channel, the downstream data including a registration timeslot, the unregistered ONU can send a registration response packet to the OLT by using the second upstream burst transmitter 552 in the second optical module 912, to complete registration and activation. After the ONU completes registration, the second optical module 912 is removed, and the first optical module 911 is slot into the optical module slot 910, so that after receiving, on the downstream channel, the downstream data including an upstream sending timeslot, a registered ONU can send upstream service data to the OLT by using the first upstream burst transmitter 551 in the first optical module 911.

It should be noted that after the second optical module 912 is removed and before the first optical module 911 is slot into the optical module slot 910, the ONU may be out of synchronization because the ONU receives, within a particular time period, no downstream data sent by the OLT. As a result, the ONU exits from a normal working state. To enable the ONU to recover the normal working state, after the second optical module 911 is slot into the optical module slot 910, the OLT delivers registration information to the ONU on the downstream channel, so that the ONU recovers the normal working state based on the registration information.

Obviously, when installing the ONU, an installation person only needs to perform ONU registration in an ONU registration stage by using the second optical module 912, and after completing the ONU registration, slots the first optical module 910 into the ONU, to complete ONU installation. An installation person can complete installation of different ONUs by using the same second optical module 912, to reduce ONU manufacturing costs.

In another possible implementation, the wavelength mutilplexer/demutilplexer 560, the downstream TC module 510, the DBA response module 520, the upstream TC module 530, and the second optical module 912 may further form an ONU registration device dedicated for registration, and an SN or a MAC address of the ONU registration device is set to be modifiable. When a newly added ONU (including the first optical module 910) needs to be registered, the ONU registration device obtains an SN or a MAC address of the newly added ONU and the newly added ONU accesses the PON system. When receiving the downstream data sent by the OLT on the downstream channel, the ONU registration device sends the registration response packet (including an SN or a MAC address of the newly added ONU) on the second upstream channel based on a registration timeslot included in the downstream data, to complete registration and activation. After the ONU registration device completes registration based on an SN or a MAC address of the newly added ONU, the ONU registration device is removed and the newly added ONU accesses the PON system. Because the ONU registration device already performs registration by using the SN or the MAC address of the newly added ONU, registration is completed when the newly added ONU accesses the PON system, and upstream service data can be sent by using the first upstream burst transmitter 551 in the first optical module 910.

It should be noted that after the ONU registration device is removed and the newly added ONU accesses the PON system, the newly added ONU may be in an initial state. To enable the newly added ONU to normally work, the OLT delivers registration information to the ONU on the downstream channel, so that the ONU recovers a normal working state based on the registration information.

In this embodiment, the downstream receiver and the first upstream burst transmitter are integrated into the first optical module, and the downstream receiver and the second upstream burst transmitter are integrated into the second optical module, so that different newly added ONUs all can complete ONU registration by using the same second optical module, thereby improving utilization of the second upstream burst transmitter and reducing ONU manufacturing costs.

Figure 10:
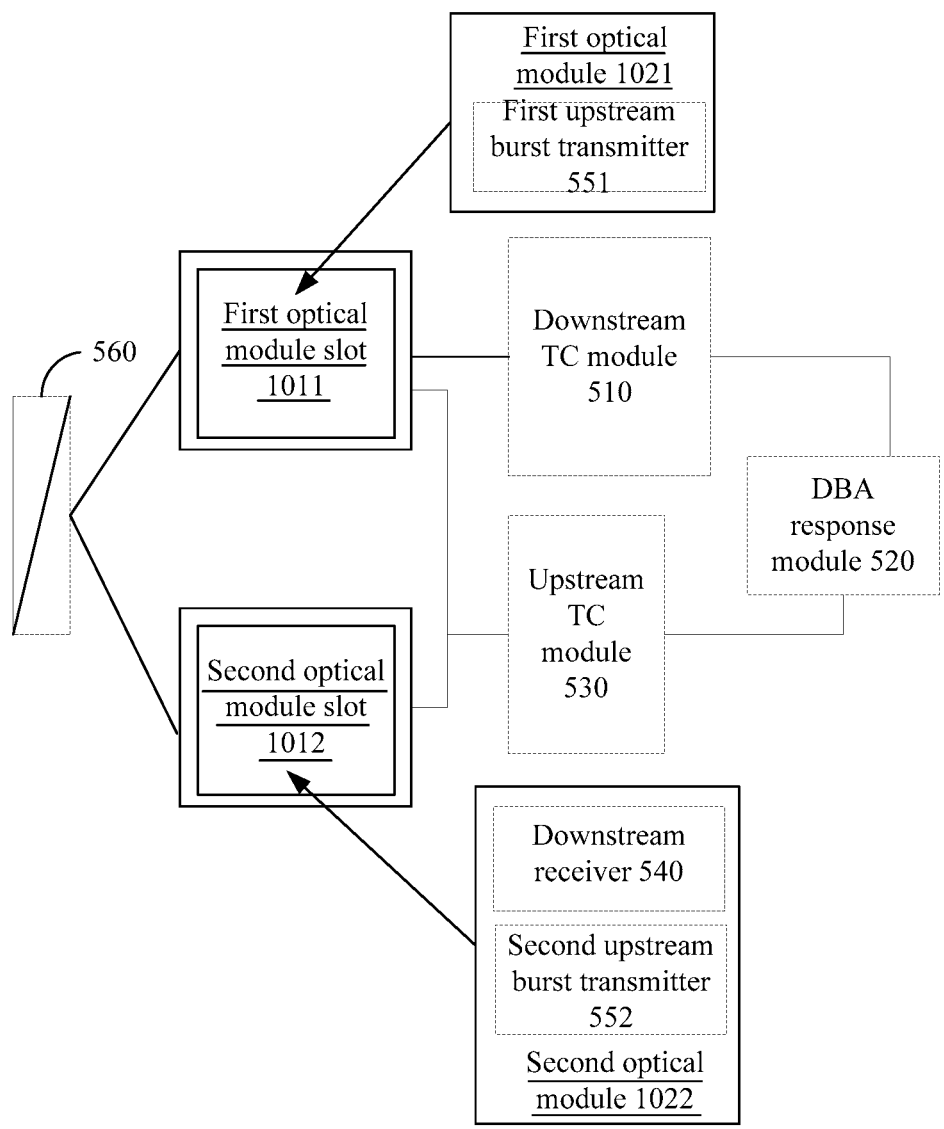
FIG. 10 is a schematic structural diagram of an ONU according to a sixth embodiment of this application.

In the ONU shown in FIG. 9, the second upstream channel is only used to perform ONU registration, and all upstream service data is transmitted on the first upstream channel. When a data volume of the upstream service data is relatively large, transmission pressure is excessively large on the first upstream channel, and a low-delay service is affected. To reduce transmission pressure on a single upstream channel, based on the ONU shown in FIG. 5, as shown in FIG. 10, the ONU includes a first optical module slot 1011 and a second optical module slot 1012. The first optical module slot 1011 is used for a first optical module 1021 to slot into, and the second optical module slot 1012 is used for a second optical module 1022 to slot into.

The first optical module 1021 includes at least the first upstream burst transmitter 551, and the second optical module 1022 includes at least the downstream receiver 540 and the second upstream burst transmitter 552.

For a newly added ONU, the second optical module 1022 is slot into the second optical module slot 1012, and the ONU accesses the PON system, so that the ONU may receive downstream data by using the downstream receiver 540 in the second optical module 1022, and complete registration and activation on a second upstream channel based on a registration timeslot included in the downstream data. When the ONU is only configured to transmit upstream service data of a high-delay service, after completing the registration on the second upstream channel, the ONU further sends the upstream service data on the second upstream channel. Because the high-delay service is insensitive to a delay, although the newly added ONU performs device registration on the second upstream channel, the registered ONU is not severely affected.

When the ONU needs to transmit upstream service data of a low-delay service, to prevent ONU registration from affecting the low-delay service, the first optical module 1021 needs to be slot into the first optical module slot 1011. After the first optical module 1021 is slot into the ONU, the ONU transmits, by using the second upstream burst transmitter 552 in the second optical module 1022, second upstream service data corresponding to a high-delay service, and transmits, by using the first upstream burst transmitter 551 in the first optical module 1021, first upstream service data corresponding to a low-delay service, to offload the upstream service data. At the same time, because the newly added ONU performs registration on the second upstream channel, ONU registration does not affect transmission of the upstream service data on the first upstream channel.

It should be noted that when the optical module shown in FIG. 9 and FIG. 10 includes both the upstream burst transmitter and the downstream receiver, the optical module further needs to include a wavelength mutilplexer/demutilplexer, to combine or split a received optical carrier signal. This is not limited in this embodiment of this application.

Figure 11:
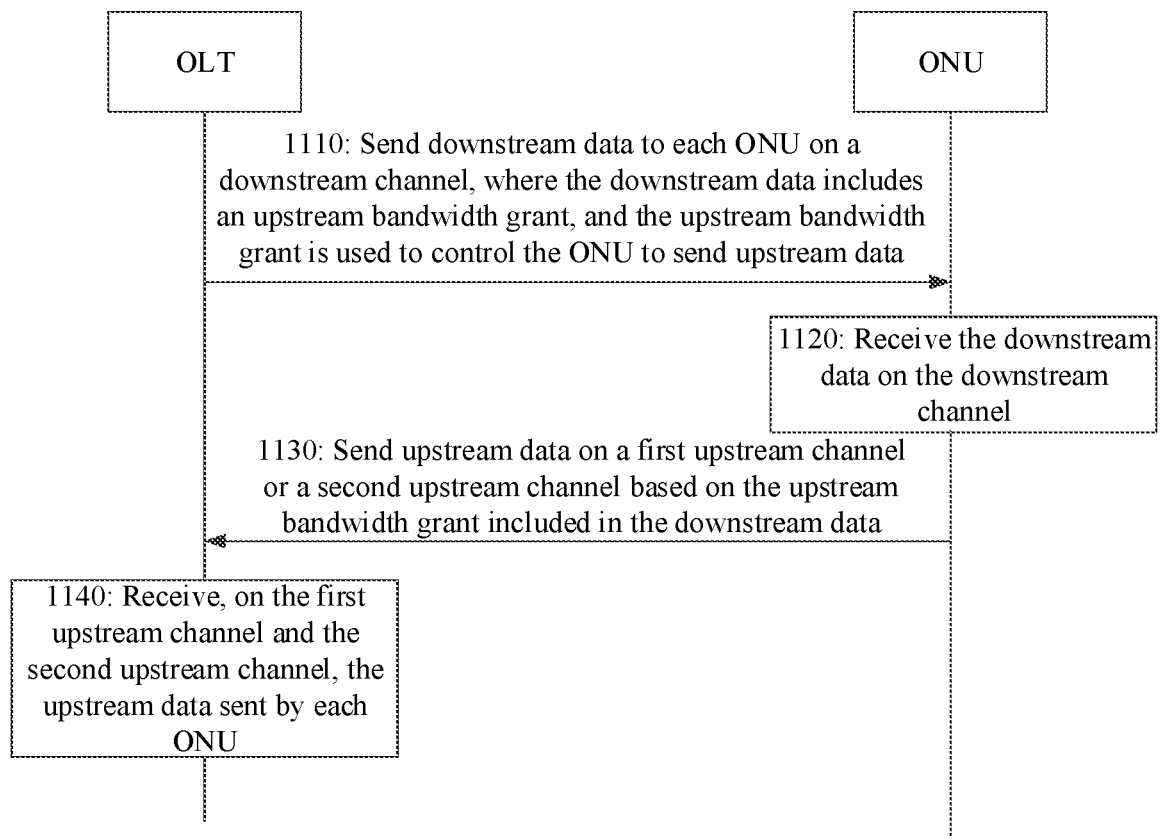
FIG. 11 is a flowchart of a data exchange process in a PON system according to an embodiment of this application.

FIG. 11 is a flowchart of a data exchange process in a PON system according to an embodiment of this application. The PON system includes an OLT and at least two ONUs, the OLT is connected to each ONU by using an ODN, and the OLT and the at least two ONUs exchange data on one downstream channel and two upstream channels in the ODN.

Step 1110: The OLT sends downstream data to each ONU on a downstream channel, where the downstream data includes an upstream bandwidth grant, and the upstream bandwidth grant is used to control the ONU to send upstream data.

Optionally, the upstream bandwidth grant is generated by at least one DBA scheduling module of the OLT.

Optionally, the downstream data includes a first upstream bandwidth grant and a second upstream bandwidth grant, the first upstream bandwidth grant is used to control the ONU to send the upstream data on a first upstream channel, the second upstream bandwidth grant is used to control the ONU to send the upstream data on a second upstream channel, and the upstream data sent by the ONU includes upstream service data or a registration response packet.

Optionally, if the PON system is a GPON system, the upstream bandwidth grant is carried in a BWmap message; or if the PON system is an EPON system, the upstream bandwidth grant is carried in a Gate message.

Step 1120: The ONU receives the downstream data on the downstream channel.

Correspondingly, each ONU in the PON system receives, on the downstream channel, the downstream data sent by the OLT in a broadcast manner.

Step 1130: The ONU sends the upstream data on a first upstream channel or a second upstream channel based on the upstream bandwidth grant included in the downstream data.

The ONU further obtains the upstream bandwidth grant included in the downstream data, and sends the upstream data to the OLT on the first upstream channel or the second upstream channel based on a registration status of the ONU. A registration function is disabled on the first upstream channel, the registration function is enabled on the second upstream channel, and the registration function is used to register an unregistered ONU.

Optionally, when the ONU is in an unregistered state and the obtained upstream bandwidth grant includes a registration timeslot, the ONU sends a registration response packet to the OLT in the registration timeslot on the second upstream channel on which the registration function is enabled.

Optionally, when the ONU is in a registered state and the obtained upstream bandwidth grant includes an upstream sending timeslot, the ONU sends upstream service data to the OLT in the upstream sending timeslot on the first upstream channel on which the registration function is disabled, or the ONU sends upstream service data to the OLT in the upstream sending timeslot on both the first upstream channel and the second upstream channel.

In this embodiment, the ONU sends upstream service data and performs ONU registration on different upstream channels based on the upstream bandwidth grant generated by the OLT, to prevent ONU registration from affecting sending of the upstream service data and satisfy a system delay requirement of a low-delay service.

It should be noted that the downstream channel, the first upstream channel, and the second upstream channel share one ODN in a wavelength division multiplexing manner, and wavelengths of the first upstream channel and the second upstream channel are different, to avoid interference between the first upstream channel and the second upstream channel.

Step 1140: The OLT receives, on the first upstream channel and the second upstream channel, the upstream data sent by each ONU.

Correspondingly, the OLT receives, on the first upstream channel and the second upstream channel, the upstream data sent by each ONU. The upstream data includes a registration response packet sent on the second upstream channel and upstream service data sent on the first upstream channel and/or the second upstream channel.

Optionally, when the OLT receives upstream service data sent by a registered ONU, the OLT parses the upstream service data, and further feeds back corresponding downstream data to the ONU on the downstream channel. When the OLT receives a registration response packet sent by an unregistered ONU, the OLT registers the unregistered ONU.

In a possible implementation, the downstream data sent by the OLT on the downstream channel includes the first upstream bandwidth grant and the second upstream bandwidth grant. After receiving the downstream data, the ONU sends the upstream data to the OLT on the first upstream channel based on the first upstream bandwidth grant, and/or sends the upstream data to the OLT on the second upstream channel based on the second upstream bandwidth grant. The following provides descriptions by using an embodiment as an example.

Figure 12:
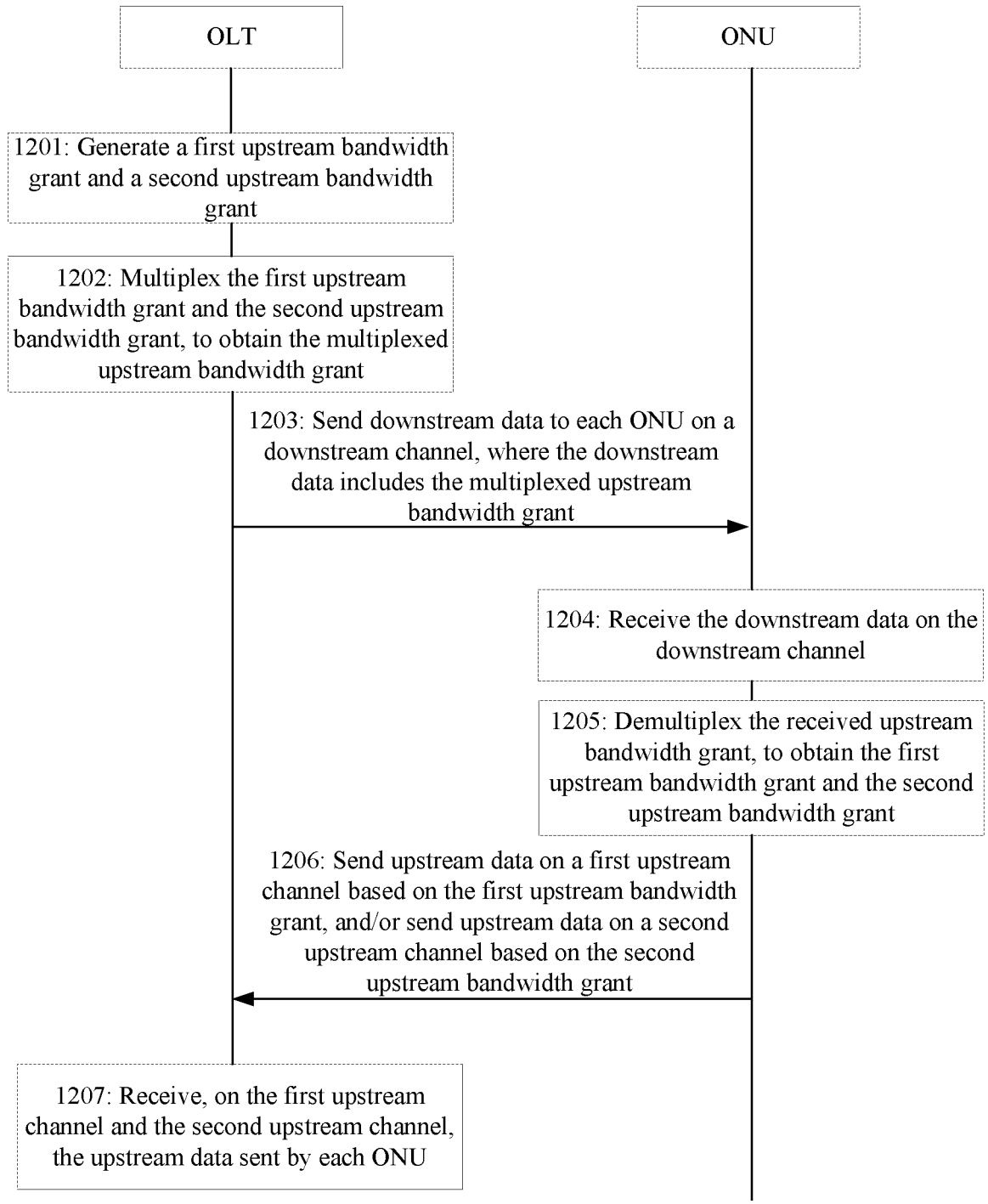
FIG. 12 is a flowchart of a data exchange process in a PON system according to another embodiment of this application.

FIG. 12 is a flowchart of a data exchange process in a PON system according to another embodiment of this application.

Step 1201: An OLT generates a first upstream bandwidth grant and a second upstream bandwidth grant.

In this embodiment, in the PON system, a registration function is disabled on a first upstream channel and the registration function is enabled on a second upstream channel. In other words, an unregistered ONU in the PON system completes registration and activation on the second upstream channel. Correspondingly, the first upstream bandwidth grant generated by the OLT is used to instruct a registered ONU to send upstream service data on the first upstream channel, and the second upstream bandwidth grant generated by the OLT is used to instruct an unregistered ONU to send a registration response packet on the second upstream channel in a registration period, or the second upstream bandwidth grant is used to instruct a registered ONU to send upstream service data on the second upstream channel in a non-registration period.

Optionally, the OLT includes a first DBA scheduling module and a second DBA scheduling module, generates the first upstream bandwidth grant by using the first DBA scheduling module, and generates the second upstream bandwidth grant by using the second DBA scheduling module.

In a possible implementation, when the first upstream channel is configured to transmit only upstream service data, and the second upstream channel is configured to transmit only a registration response packet, the OLT generates the first upstream bandwidth grant including an upstream sending timeslot, and generates the second upstream bandwidth grant including a registration timeslot. The first upstream bandwidth grant is used to instruct a registered ONU in the PON system to send upstream service data on the first upstream channel in the upstream sending timeslot. The second upstream bandwidth grant is used to instruct an unregistered ONU in the PON system to send a registration response packet on the second upstream channel in the registration timeslot.

In another possible implementation, when the first upstream channel is configured to transmit first upstream service data, and the second upstream channel is configured to transmit a registration response packet and second upstream service data, the OLT generates the first upstream bandwidth grant including a first upstream sending timeslot, and generates the second upstream bandwidth grant including a second upstream sending timeslot and a registration timeslot. The first bandwidth grant is used to instruct a registered ONU in the PON system to send the first upstream service data on the first upstream channel in the first upstream sending timeslot. The second bandwidth grant is used to instruct a registered ONU to send the second upstream service data on the second upstream channel in a non-registration period (that is, a non-quiet zone) (based on the second upstream sending timeslot), or the second bandwidth grant is used to instruct an unregistered ONU to send the registration response packet on the second upstream channel in a registration period (based on the registration timeslot). A delay requirement of the first upstream service data is higher than a delay requirement of the second upstream service data.

It should be noted that enabling and disabling of the registration function on the first upstream channel and the second upstream channel are flexibly configured by the OLT. To be specific, the OLT may configure enabling of the registration function on the first upstream channel and configure disabling of the registration function on the second upstream channel. Alternatively, the OLT may configure disabling of the registration function on the first upstream channel, and configure enabling of the registration function on the second upstream channel. In this embodiment of this application, only an example in which the registration function is disabled on the first upstream channel and the registration function is enabled on the second upstream channel is used for description. However, this is not limited.

Optionally, the OLT obtains channel transmission quality of the first upstream channel and the second upstream channel at predetermined intervals. When the channel transmission quality of the first upstream channel is better than the channel transmission quality of the second upstream channel, the OLT controls the registration function to be disabled on the first upstream channel, and controls the registration function to be enabled on the second upstream channel. When the channel transmission quality of the second upstream channel is better than the channel transmission quality of the first upstream channel, the OLT controls the registration function to be disabled on the second upstream channel, and controls the registration function to be enabled on the first upstream channel.

Optionally, upstream data is sent on the first upstream channel and the second upstream channel in bursts. Therefore, to enable the OLT to learn of an arriving time of the upstream data so that an upstream burst receiver of the OLT makes preparations for receiving data before the upstream data arrives, the OLT stores the generated first upstream bandwidth grant and second upstream bandwidth grant, and controls, based on the first upstream bandwidth grant and the second upstream bandwidth grant, the corresponding upstream burst receiver to receive the upstream data.

Step 1202: The OLT multiplexes the first upstream bandwidth grant and the second upstream bandwidth grant, to obtain the multiplexed upstream bandwidth grant.

Optionally, a multiplexing module is disposed in the OLT, and the multiplexing module performs multiplexing and convergence on the upstream bandwidth grants generated by the OLT.

Because the first upstream bandwidth grant and the second upstream bandwidth grant are sent to the ONU on a same downstream channel after being multiplexed, in a process of multiplexing the first upstream bandwidth grant and the second upstream bandwidth grant, the OLT needs to add corresponding upstream channel identifiers to the first upstream bandwidth grant and the second upstream bandwidth grant, and then multiplexes the upstream bandwidth grants to which the upstream channel identifiers are added. In this way, the ONU can identify the first upstream bandwidth grant and the second upstream bandwidth grant, and determine upstream channels corresponding to different upstream bandwidth grants. Optionally, the OLT may alternatively directly generate the first upstream bandwidth grant and the second upstream bandwidth grant carrying upstream channel identifiers. This is not limited in this embodiment of this application.

In a possible implementation, when the OLT is used in a GPON system, the OLT separately adds upstream channel identifiers to a first BWmap message (that is, a message carrying the first upstream bandwidth grant) and a second BWmap message (that is, a message carrying the second upstream bandwidth grant).

In a possible implementation, when the OLT is used in an EPON system, the OLT separately adds upstream channel identifiers to a first Gate message (that is, a message carrying the first upstream bandwidth grant) and a second Gate message (that is, a message carrying the second upstream bandwidth grant).

Step 1203: The OLT sends downstream data to each ONU on a downstream channel, where the downstream data includes the multiplexed upstream bandwidth grant.

Optionally, after performing upper-layer service adaptation, GEM encapsulation, TC framing, and physical layer adaptation, the OLT generates the downstream data, and controls a built-in downstream transmitter to send the downstream data on the downstream channel. The upper-layer service adaptation includes user data adaptation, OMCI adaptation, and the like.

Step 1204: The ONU receives the downstream data on the downstream channel.

Correspondingly, each ONU in the PON system receives, on the downstream channel, the downstream data sent by the OLT in a broadcast manner.

Step 1205: The ONU demultiplexes the received upstream bandwidth grant, to obtain the first upstream bandwidth grant and the second upstream bandwidth grant.

After receiving the downstream data, the ONU obtains the multiplexed upstream bandwidth grant included in the downstream data, and demultiplexes the upstream bandwidth grant to obtain the first upstream bandwidth grant and the second upstream bandwidth grant.

Optionally, the ONU obtains the multiplexed upstream bandwidth grant, and demultiplexes the multiplexed upstream bandwidth grant based on the upstream channel identifiers included in the upstream bandwidth grant, to obtain the first upstream bandwidth grant used to control the first upstream channel and the second upstream bandwidth grant used to control the second upstream channel.

Step 1206: The ONU sends upstream data on a first upstream channel based on the first upstream bandwidth grant, and/or sends upstream data on a second upstream channel based on the second upstream bandwidth grant.

In a possible implementation, when the first upstream channel is used to transmit upstream service data, and the second upstream channel is used to transmit only a registration response packet, a registered ONU sends the upstream service data on the first upstream channel based on an upstream sending timeslot included in the first upstream bandwidth grant; and an unregistered ONU sends the registration response packet on the second upstream channel based on a registration timeslot included in the second upstream bandwidth grant.

In another possible implementation, when the first upstream channel is used to transmit first upstream service data, and the second upstream channel is used to transmit a registration response packet and second upstream service data, a registered ONU sends the first upstream service data on the first upstream channel based on a first upstream sending timeslot included in the first upstream bandwidth grant, and sends the second upstream service data on the second upstream channel based on a second upstream sending timeslot included in the second upstream bandwidth grant; and an unregistered ONU sends the registration response packet to the OLT on the second upstream channel based on a registration timeslot in the second upstream bandwidth grant, to complete registration and activation.

A same ONU needs to execute a plurality of services and different services have different delay requirements. Optionally, to ensure that the PON system satisfies a delay requirement of a low-delay service, before sending upstream data on two upstream channels, a registered ONU collects a delay requirement of each upper-layer service, and determines a service class of the service based on the delay requirement of the service. When a service class indicates that a service belongs to a first class, the ONU determines to send, on the first upstream channel, upstream data corresponding to the service; when a service class indicates that a service belongs to a second class, the ONU determines to send, on the second upstream channel, upstream data corresponding to the service.

It should be noted that for upstream data sent on a same upstream channel, the ONU may further sort services based on service priorities, and preferentially send upstream data corresponding to a high-priority service. This is not limited in this embodiment.

Step 1207: The OLT receives, on the first upstream channel and the second upstream channel, the upstream data sent by each ONU.

Optionally, a first upstream burst receiver and a second upstream burst receiver are disposed in the OLT. The OLT receives, on the first upstream channel by using the first upstream burst receiver, upstream service data sent by a registered ONU, and receives, on the second upstream channel by using the second upstream burst receiver, upstream service data sent by a registered ONU or a registration response packet sent by an unregistered ONU.

Optionally, when the OLT stores the generated upstream bandwidth grant, the OLT resets the built-in upstream burst receiver before upstream data arrives, to instruct the upstream burst receiver to start to receive the upstream data transmitted by the ONU on the first upstream channel and the second upstream channel.

Optionally, the OLT may further identify, based on the upstream bandwidth grant, an ONU that transmits upstream data on the first upstream channel and an ONU that transmits upstream data on the second upstream channel, to further forward the upstream data.

Optionally, the OLT may further perform, based on the upstream bandwidth grant, authentication on the upstream data sent by the ONU, to determine whether the PON system has an ONU that performs unauthorized access. For example, if detecting upstream data outside an upstream sending timeslot indicated by the upstream bandwidth grant, the OLT determines that the PON system has an ONU that performs unauthorized access. For another example, after receiving upstream data, the OLT searches the upstream bandwidth grant for a corresponding ONU identifier based on an upstream sending timeslot in which a sending party (an ONU sending the upstream data) sends the upstream data, and if a found ONU identifier is inconsistent with an ONU identifier of the sending party, determines that the PON system has an ONU that performs unauthorized access. The ONU identifier is an LLID or an ONU ID allocated by the OLT. For upstream data that fails to be authenticated, the OLT directly filters the upstream data, and for upstream data that has been authenticated, the OLT further parses the upstream data to obtain service information included in the upstream data.

In this embodiment, the OLT generates the first upstream bandwidth grant and the second upstream bandwidth grant respectively used to control the first upstream channel and the second upstream channel, and multiplexes the first upstream bandwidth grant and the second upstream bandwidth grant, to provide the multiplexed upstream bandwidth grant for each ONU on the downstream channel. In this way, the ONU can separately control data sending on the first upstream channel and the second upstream channel based on the received upstream bandwidth grant, to ensure that the upstream data sequentially reaches the OLT through the first upstream channel and the second upstream channel, and avoid a conflict between the upstream data.

In this embodiment, the OLT controls, by using the generated upstream bandwidth grant, the upstream burst receiver to receive upstream data, so that the upstream data is received more accurately. At the same time, the OLT performs authentication on the received upstream data by using the upstream bandwidth grant, to prevent an ONU that performs unauthorized access from affecting the PON system.

Further embodiments of the present invention are provided in the following. It should be noted that the numbering used in the following section does not necessarily need to comply with the numbering used in the previous sections.

Embodiment 1. A passive optical network (PON) system, wherein the system comprises: an optical line terminal (OLT) and at least two optical network units (ONUs), the OLT is connected to each ONU by using an optical distribution network (ODN), and the OLT and the at least two ONUs exchange data on one downstream channel and two upstream channels; the OLT sends downstream data to each ONU on the downstream channel, wherein the downstream data comprises an upstream bandwidth grant, and the upstream bandwidth grant is used to control the ONU to send upstream data; the ONU receives the downstream data on the downstream channel, and sends the upstream data on a first upstream channel or a second upstream channel based on the upstream bandwidth grant comprised in the downstream data; and the OLT receives, on the first upstream channel and the second upstream channel, the upstream data sent by each ONU, wherein a registration function is disabled on the first upstream channel, the registration function is enabled on the second upstream channel, and the registration function is used to register an unregistered ONU.

Embodiment 2. The system according to embodiment 1, wherein the downstream data comprises a first upstream bandwidth grant and a second upstream bandwidth grant, the first upstream bandwidth grant is used to control the ONU to send upstream data on the first upstream channel, and the second upstream bandwidth grant is used to control the ONU to send upstream data on the second upstream channel.

Embodiment 3. The system according to embodiment 2, wherein the OLT generates the first upstream bandwidth grant and the second upstream bandwidth grant, and multiplexes the first upstream bandwidth grant and the second upstream bandwidth grant to obtain the multiplexed upstream bandwidth grant; and the ONU demultiplexer the received upstream bandwidth grant to obtain the first upstream bandwidth grant and the second upstream bandwidth grant; and sends upstream data on the first upstream channel based on the first upstream bandwidth grant, and sends upstream data on the second upstream channel based on the second upstream bandwidth grant.

Embodiment 4. The system according to embodiment 2 or 3, wherein the first upstream channel is used to transmit upstream service data, and the second upstream channel is used to transmit a registration response packet; the OLT generates the first upstream bandwidth grant comprising an upstream sending timeslot, and generates the second upstream bandwidth grant comprising a registration timeslot; and when the ONU is in a registered state, the ONU sends the upstream service data to the OLT on the first upstream channel based on the upstream sending timeslot in the first upstream bandwidth grant; or when the ONU is in an unregistered state, the ONU sends a registration response packet to the OLT on the second upstream channel based on the registration timeslot in the second upstream bandwidth grant.

Embodiment 5. The system according to embodiment 2 or 3, wherein the first upstream channel is used to transmit first upstream service data, the second upstream channel is used to transmit a registration response packet and second upstream service data, and a delay requirement of the first upstream service data is higher than a delay requirement of the second upstream service data; the OLT generates the first upstream bandwidth grant comprising a first upstream sending timeslot, and generates the second upstream bandwidth grant comprising a second upstream sending timeslot and a registration timeslot; and when the ONU is in a registered state, the ONU sends the first upstream service data to the OLT on the first upstream channel based on the first upstream sending timeslot in the first upstream bandwidth grant, and sends the second upstream service data to the OLT on the second upstream channel based on the second upstream sending timeslot in the second upstream bandwidth grant; or when the ONU is in an unregistered state, the ONU sends a registration response packet to the OLT on the second upstream channel based on the registration timeslot in the second upstream bandwidth grant.

Embodiment 6. The system according to any one of embodiments 1 to 5, wherein the OLT obtains channel transmission quality of the first upstream channel and the second upstream channel; and when the channel transmission quality of the first upstream channel is better than the channel transmission quality of the second upstream channel, the OLT controls the registration function to be disabled on the first upstream channel and controls the registration function to be enabled on the second upstream channel.

Embodiment 7. The system according to any one of embodiments 1 to 5, wherein the OLT stores the generated upstream bandwidth grant; and the OLT controls receiving of the upstream data based on the upstream bandwidth grant, and/or performs, based on the upstream bandwidth grant, authentication and parsing on the upstream data sent by each ONU.

Embodiment 8. The system according to any one of embodiments 1 to 5, wherein the ONU determines a service class of each service based on a delay requirement of the service; and when the service class indicates that the service belongs to a first class, the ONU sends, on the first upstream channel, upstream data corresponding to the service; or when the service class indicates that the service belongs to a second class, the ONU sends, on the second upstream channel, upstream data corresponding to the service, wherein a delay requirement of a service belonging to the first class is higher than a delay requirement of a service belonging to the second class.

Embodiment 9. The system according to any one of embodiments 1 to 5, wherein if the system is a gigabit-capable passive optical network (GPON) system, a bandwidth map (BWmap) message carries the upstream bandwidth grant; or if the system is an Ethernet passive optical network EPON system, a Gate message carries the upstream bandwidth grant.

Embodiment 10. The system according to embodiment 9, wherein when the BWmap message carries the upstream bandwidth grant, a predetermined bit of a predetermined field in the BWmap message is used to identify an upstream channel corresponding to the BWmap message; and when the Gate message carries the upstream bandwidth grant, a channel identifier field newly added to the Gate message is used to identify an upstream channel corresponding to the Gate message, or operation code of the Gate message is used to identify an upstream channel corresponding to the Gate message, wherein the predetermined field is a start time field or a grant size field, and the predetermined bit is a maximum of 1 bit or a maximum of 2 bits of the predetermined field.

Embodiment 11. The system according to any one of embodiments 1 to 5, wherein the downstream channel, the first upstream channel, and the second upstream channel share the ODN in a wavelength division multiplexing manner, and wavelengths of the first upstream channel and the second upstream channel are different.

Embodiment 12. An optical line terminal (OLT), wherein the OLT comprises: at least one dynamic bandwidth allocation (DBA) scheduling module, a downstream transmission convergence TC module, an upstream TC module, a downstream transmitter, a first upstream burst receiver, and a second upstream burst receiver, wherein the DBA scheduling module is configured to generate an upstream bandwidth grant, wherein the upstream bandwidth grant is used to control each optical network unit (ONU) to send upstream data; the downstream TC module is connected to the DBA scheduling module, and is configured to generate, through downstream framing and convergence, downstream data comprising the upstream bandwidth grant; the downstream transmitter is connected to the downstream TC module, and is configured to send the downstream data to each ONU on a downstream channel; the upstream TC module is connected to the first upstream burst receiver, and is configured to receive, by using the first upstream burst receiver, the upstream data sent by each ONU on a first upstream channel; and the upstream TC module is further connected to the second upstream burst receiver, and is configured to receive, by using the second upstream burst receiver, the upstream data sent by each ONU on a second upstream channel, wherein a registration function is disabled on the first upstream channel, the registration function is enabled on the second upstream channel, and the registration function is used to register the unregistered ONU.

Embodiment 13. The OLT according to embodiment 12, wherein the downstream data comprises a first upstream bandwidth grant and a second upstream bandwidth grant, the first upstream bandwidth grant is used to control the ONU to send upstream data on the first upstream channel, and the second upstream bandwidth grant is used to control the ONU to send upstream data on the second upstream channel.

Embodiment 14. The OLT according to embodiment 13, wherein the OLT comprises a first DBA scheduling module, a second DBA scheduling module, and a multiplexing module, wherein the first DBA scheduling module is configured to generate the first upstream bandwidth grant; the second DBA scheduling module is configured to generate the second upstream bandwidth grant; the multiplexing module is connected to the first DBA scheduling module and the second DBA scheduling module, and is configured to multiplex the first upstream bandwidth grant and the second upstream bandwidth grant; and the multiplexing module is further connected to the downstream TC module, and is configured to provide the multiplexed upstream bandwidth grant for the downstream TC module.

Embodiment 15. The OLT according to embodiment 14, wherein the first upstream channel is used to transmit upstream service data, and the second upstream channel is used to transmit a registration response packet; the first DBA scheduling module is configured to generate the first upstream bandwidth grant comprising an upstream sending timeslot; and the second DBA scheduling module is configured to generate the second upstream bandwidth grant comprising a registration timeslot, wherein the upstream sending timeslot is used to instruct the registered ONU to send the upstream service data on the first upstream channel, and the registration timeslot is used to instruct the unregistered ONU to send the registration response packet on the second upstream channel.

Embodiment 16. The OLT according to embodiment 14, wherein the first upstream channel is used to transmit first upstream service data, the second upstream channel is used to transmit a registration response packet and second upstream service data, and a delay requirement of the first upstream service data is higher than a delay requirement of the second upstream service data; the first DBA scheduling module is configured to generate the first upstream bandwidth grant comprising a first upstream sending timeslot; and the second DBA scheduling module is configured to generate the second upstream bandwidth grant comprising a second upstream sending timeslot and a registration timeslot, wherein the first upstream sending timeslot is used to instruct the registered ONU to send the first upstream service data on the first upstream channel, the second upstream sending timeslot is used to instruct the registered ONU to send the second upstream service data on the second upstream channel, the registration timeslot is used to instruct the unregistered ONU to send the registration response packet on the second upstream channel.

Embodiment 17. The OLT according to any one of embodiments 14 to 16, wherein the OLT further comprises a control module, and the control module is connected to the first DBA scheduling module and the second DBA scheduling module; and the control module is configured to: control the first DBA scheduling module to disable the registration function, and control the second DBA scheduling module to enable the registration function, wherein the second upstream bandwidth grant generated by the second DBA scheduling module that enables the registration function comprises the registration timeslot, and the registration timeslot is used to instruct the unregistered ONU to send the registration response packet on the second upstream channel.

Embodiment 18. The OLT according to embodiment 13, wherein the OLT comprises one DBA scheduling module and a control module connected to the DBA scheduling module; the control module is configured to control the DBA scheduling module to enable or disable the registration function; when disabling the registration function, the DBA scheduling module is configured to: generate the first upstream bandwidth grant comprising a first upstream sending timeslot, or generate the first upstream bandwidth grant comprising the first upstream sending timeslot and the second upstream bandwidth grant comprising a second upstream sending timeslot; and when enabling the registration function, the DBA scheduling module is further configured to generate the first upstream bandwidth grant comprising the first upstream sending timeslot and the second upstream bandwidth grant comprising a registration timeslot, wherein the first upstream sending timeslot is used to instruct the registered ONU to send the first upstream service data on the first upstream channel, the second upstream sending timeslot is used to instruct the registered ONU to send the second upstream service data on the second upstream channel, a delay requirement of the first upstream service data is higher than a delay requirement of the second upstream service data, and the registration timeslot is used to instruct the unregistered ONU to send a registration response packet on the second upstream channel.

Embodiment 19. The OLT according to any one of embodiments 12 to 18, wherein the OLT further comprises a memory; the memory is connected to each DBA scheduling module, and is configured to store the upstream bandwidth grant generated by each DBA scheduling module; and the upstream TC module is connected to the memory, and is configured to: control, based on the upstream bandwidth grant, the first upstream burst receiver and the second upstream burst receiver to receive the upstream data, and/or perform, based on the upstream bandwidth grant, authentication and parsing on the upstream data sent by each ONU.

Embodiment 20. The OLT according to any one of embodiments 12 to 19, wherein if the OLT is used in a gigabit-capable passive optical network (GPON) system, a bandwidth map (BWmap) message carries the upstream bandwidth grant; or if the OLT is used in an Ethernet passive optical network EPON system, a Gate message carries the upstream bandwidth grant.

Embodiment 21. The OLT according to embodiment 20, wherein when the BWmap message carries the upstream bandwidth grant, a predetermined bit of a predetermined field in the BWmap message is used to identify an upstream channel corresponding to the BWmap message; and when the Gate message carries the upstream bandwidth grant, a channel identifier field newly added to the Gate message is used to identify an upstream channel corresponding to the Gate message, or operation code of the Gate message is used to identify an upstream channel corresponding to the Gate message, wherein the predetermined field is a start time field or a grant size field, and the predetermined bit is one most significant bit or two most significant bits of the predetermined field.

Embodiment 22. The OLT according to any one of embodiments 12 to 19, wherein the downstream channel, the first upstream channel, and the second upstream channel share one optical distribution network (ODN) in a wavelength division multiplexing manner, and wavelengths of the first upstream channel and the second upstream channel are different.

Embodiment 23. An optical network unit (ONU), wherein the ONU comprises: a downstream transmission convergence (TC) module, at least one dynamic bandwidth allocation (DBA) response module, an upstream TC module, a downstream receiver, a first upstream burst transmitter, and a second upstream burst transmitter, wherein the downstream TC module is connected to the downstream receiver and the DBA response module, and is configured to provide, for the DBA response module, downstream data received by the downstream receiver on a downstream channel, wherein the downstream data is sent by an optical line terminal (OLT); the DBA response module is connected to the upstream TC module, and is configured to control, based on an upstream bandwidth grant comprised in the downstream data, the upstream TC module to send upstream data; the upstream TC module is connected to the first upstream burst transmitter, and is configured to send the upstream data on a first upstream channel by using the first upstream burst transmitter; and the upstream TC module is connected to the second upstream burst transmitter, and is configured to send the upstream data on a second upstream channel by using the second upstream burst transmitter, wherein a registration function is disabled on the first upstream channel, the registration function is enabled on the second upstream channel, and the registration function is used to register the unregistered ONU.

Embodiment 24. The ONU according to embodiment 23, wherein the downstream data comprises a first upstream bandwidth grant and a second upstream bandwidth grant, the first upstream bandwidth grant is used to control the ONU to send upstream data on the first upstream channel, and the second upstream bandwidth grant is used to control the ONU to send upstream data on the second upstream channel.

Embodiment 25. The ONU according to embodiment 24, wherein the ONU comprises a first DBA response module, a second DBA response module, and a demultiplexing module, wherein the demultiplexing module is connected to the downstream TC module, and is configured to demultiplex the upstream bandwidth grant received by the downstream TC module, to obtain the first upstream bandwidth grant and the second upstream bandwidth grant; the first DBA response module is connected to the demultiplexing module, and is configured to control, based on the first upstream bandwidth grant, the upstream TC module to send the upstream data on the first upstream channel; and the second DBA response module is connected to the demultiplexing module, and is configured to control, based on the second upstream bandwidth grant, the upstream TC module to send the upstream data on the second upstream channel.

Embodiment 26. The ONU according to embodiment 25, wherein the first upstream channel is used to transmit upstream service data, and the second upstream channel is used to transmit a registration response packet; if the ONU is in a registered state, the upstream TC module is configured to send a first enabling signal to the first upstream burst transmitter based on an upstream sending timeslot in the first upstream bandwidth grant, wherein the first enabling signal is used to instruct the first upstream burst transmitter to send the upstream service data on the first upstream channel; and if the ONU is in an unregistered state, the upstream TC module is configured to send a second enabling signal to the second upstream burst transmitter based on a registration timeslot in the second upstream bandwidth grant, wherein the second enabling signal is used to instruct the second upstream burst transmitter to send the registration response packet on the second upstream channel.

Embodiment 27. The ONU according to embodiment 25 or 26, wherein the ONU comprises an optical module slot, and the optical module slot is used for a first optical module or a second optical module to slot into; the first optical module comprises at least the downstream receiver and the first upstream burst transmitter; and the second optical module comprises at least the downstream receiver and the second upstream burst transmitter, wherein when the ONU is in the unregistered state, the second optical module is slot into the optical module slot; or when the ONU is in the registered state, the first optical module is slot into the optical module slot.

Embodiment 28. The ONU according to embodiment 25, wherein the first upstream channel is used to transmit first upstream service data, the second upstream channel is used to transmit a registration response packet and second upstream service data, and a delay requirement of the first upstream service data is higher than a delay requirement of the second upstream service data; if the ONU is in a registered state, the upstream TC module is configured to: send a third enabling signal to the first upstream burst transmitter based on a first upstream sending timeslot in the first upstream bandwidth grant, wherein the third enabling signal is used to instruct the first upstream burst transmitter to send the first upstream service data on the first upstream channel; and send a fourth enabling signal to the second upstream burst transmitter based on a second upstream sending timeslot in the second upstream bandwidth grant, wherein the fourth enabling signal is used to instruct the second upstream burst transmitter to send the second upstream service data on the second upstream channel; and if the ONU is in an unregistered state, the upstream TC module is configured to send a fifth enabling signal to the second upstream burst transmitter based on a registration timeslot in the second upstream bandwidth grant, wherein the fifth enabling signal is used to instruct the second upstream burst transmitter to send the registration response packet on the second upstream channel.

Embodiment 29. The ONU according to embodiment 27, wherein the ONU further comprises a service classification module; the service classification module is configured to: collect a delay requirement of each service and determine a service class of the service based on the delay requirement; the DBA response module is connected to the service classification module, and is configured to: when the service class indicates that the service belongs to a first class, control the upstream TC module to send, on the first upstream channel, first upstream service data corresponding to the service; and the DBA response module is further configured to: when the service class indicates that the service belongs to a second class, control the upstream TC module to send, on the second upstream channel, second upstream service data corresponding to the service.

Embodiment 30. The ONU according to embodiment 28 or 29, wherein the ONU comprises a first optical module slot and a second optical module slot, the first optical module slot is used for the first optical module to slot into, and the second optical module slot is used for the second optical module to slot into; the first optical module comprises at least the first upstream burst transmitter; and the second optical module comprises at least the downstream receiver and the second upstream burst transmitter, wherein when the second upstream service data is transmitted, the second optical module is slot into the second optical module slot; and when the first upstream service data and the second upstream service data are transmitted, the second optical module is slot into the second optical module slot and the first optical module is slot into the first optical module slot.

Embodiment 31. The ONU according to embodiment 24, wherein the ONU comprises one DBA response module and a channel selection module; the channel selection module is connected to the first upstream burst transmitter, the second upstream burst transmitter, and the upstream TC module; the DBA response module is configured to: control, based on the first upstream bandwidth grant, the upstream TC module to send upstream service data, or control, based on the second upstream bandwidth grant, the upstream TC module to send a registration response packet; and the channel selection module is configured to: when the ONU is in a registered state, select the first upstream burst transmitter to send the upstream service data generated by the upstream TC module, or when the ONU is in an unregistered state, select the second upstream burst transmitter to send the registration response packet generated by the upstream TC module.

Embodiment 32. The ONU according to any one of embodiments 23 to 31, wherein if the ONU is used in a gigabit-capable passive optical network (GPON) system, a bandwidth map (BWmap) message carries the upstream bandwidth grant; or if the ONU is used in an Ethernet passive optical network EPON system, a Gate message carries the upstream bandwidth grant.

Embodiment 33. The ONU according to embodiment 32, wherein when the BWmap message carries the upstream bandwidth grant, a predetermined bit of a predetermined field in the BWmap message is used to identify an upstream channel corresponding to the BWmap message; and when the Gate message carries the upstream bandwidth grant, a channel identifier field newly added to the Gate message is used to identify an upstream channel corresponding to the Gate message, or operation code of the Gate message is used to identify an upstream channel corresponding to the Gate message, wherein the predetermined field is a start time field or a grant size field, and the predetermined bit is one most significant bit or two most significant bits of the predetermined field.

Embodiment 34. The ONU according to any one of embodiments 23 to 31, wherein the downstream channel, the first upstream channel, and the second upstream channel share one optical distribution network (ODN) in a wavelength division multiplexing manner, and wavelengths of the first upstream channel and the second upstream channel are different.

The sequence numbers of the foregoing embodiments of this application are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, an optical disc, or the like.

The foregoing descriptions are merely specific embodiments of this application, but are not intended to limit this application. Any modification, equivalent replacement, or improvement made without departing from the spirit and principle of this application shall fall within the protection scope of this application.

What is claimed is:

1. A passive optical network (PON) system, wherein the system comprises:

an optical line terminal (OLT) and at least two optical network units (ONUs), wherein the OLT is connected to each ONU by using an optical distribution network (ODN), and wherein the OLT and the at least two ONUs exchange data on one downstream channel and two upstream channels;

wherein the OLT sends downstream data to each ONU on the downstream channel, wherein the downstream data comprises an upstream bandwidth grant, and wherein the upstream bandwidth grant is used to instruct each ONU to send upstream data;

wherein each ONU receives the downstream data on the downstream channel, and sends the upstream data on at least one of the two upstream channels based on the upstream bandwidth grant comprised in the downstream data; and wherein the OLT receives, on the at least one of the two upstream channels, the upstream data sent by each ONU, wherein:

the two upstream channels comprise a first upstream channel used to transmit first upstream service data and a second upstream channel used to transmit a registration response packet and second upstream service data;

the upstream bandwidth grant comprises a first upstream bandwidth grant and a second upstream bandwidth grant;

the first upstream bandwidth grant is used to instruct an ONU that is in a registered state to send the first upstream service data on the first upstream channel; and the second upstream bandwidth grant is used to instruct the ONU that is in a registered state to send the second upstream service data on the second upstream channel or instruct an ONU that is in an unregistered state to send the registration response packet on the second upstream channel.

2. The system according to claim 1, wherein:

the OLT generates the first upstream bandwidth grant and the second upstream bandwidth grant, and multiplexes the first upstream bandwidth grant and the second upstream bandwidth grant to obtain the multiplexed upstream bandwidth grant; and each ONU demultiplexer the received upstream bandwidth grant to obtain the first upstream bandwidth grant and the second upstream bandwidth grant, sends upstream data on the first upstream channel based on the first upstream bandwidth grant, and sends upstream data on the second upstream channel based on the second upstream bandwidth grant.

3. The system according to claim 1, wherein a delay requirement of the first upstream service data is higher than a delay requirement of the second upstream service data;

wherein the OLT generates the first upstream bandwidth grant comprising a first upstream sending timeslot, and generates the second upstream bandwidth grant comprising a second upstream sending timeslot or a registration timeslot; and wherein:

when the ONU is in a registered state, the ONU sends the first upstream service data to the OLT on the first upstream channel based on the first upstream sending timeslot in the first upstream bandwidth grant, and sends the second upstream service data to the OLT on the second upstream channel based on the second upstream sending timeslot in the second upstream bandwidth grant; or when the ONU is in an unregistered state, the ONU sends a registration response packet to the OLT on the second upstream channel based on the registration timeslot in the second upstream bandwidth grant.

4. The system according to claim 1, wherein the OLT obtains channel transmission quality of the first upstream channel and the second upstream channel, and wherein when the channel transmission quality of the first upstream channel is better than the channel transmission quality of the second upstream channel, the OLT controls the registration function to be disabled on the first upstream channel and controls the registration function to be enabled on the second upstream channel.

5. An optical line terminal (OLT), wherein the OLT comprises:
   at least one dynamic bandwidth allocation (DBA) scheduling module, a downstream transmission convergence (TC) module, an upstream TC module, a downstream transmitter, a first upstream burst receiver, and a second upstream burst receiver, wherein:
   the DBA scheduling module is configured to generate an upstream bandwidth grant, wherein the upstream bandwidth grant is used to instruct an optical network unit (ONU) to send upstream data;
   the downstream TC module is connected to the DBA scheduling module, and is configured to generate, through downstream framing and convergence, downstream data comprising the upstream bandwidth grant;
   the downstream transmitter is connected to the downstream TC module, and is configured to send the downstream data to the ONU on a downstream channel;
   the upstream TC module is connected to the first upstream burst receiver, and is configured to receive, by using the first upstream burst receiver, first upstream service data sent by the ONU on a first upstream channel; and
   the upstream TC module is further connected to the second upstream burst receiver, and is configured to receive, by using the second upstream burst receiver, second upstream service data and a registration response packet sent by the ONU on a second upstream channel, wherein:
   the upstream bandwidth grant comprises a first upstream bandwidth grant and a second upstream bandwidth grant;
   the first upstream bandwidth grant is used to instruct the ONU when it is in a registered state to send the first upstream service data on the first upstream channel; and
   the second upstream bandwidth grant is used to instruct the ONU when it is in a registered state to send the second upstream service data on the second upstream channel or instruct the ONU when it is in an unregistered state to send the registration response packet on the second upstream channel.

6. The OLT according to claim 5, wherein the OLT comprises a first DBA scheduling module, a second DBA scheduling module, and a multiplexing module, wherein:
   the first DBA scheduling module is configured to generate the first upstream bandwidth grant;
   the second DBA scheduling module is configured to generate the second upstream bandwidth grant;
   the multiplexing module is connected to the first DBA scheduling module and the second DBA scheduling module, and is configured to multiplex the first upstream bandwidth grant and the second upstream bandwidth grant; and
   the multiplexing module is further connected to the downstream TC module, and is configured to provide the multiplexed upstream bandwidth grant for the downstream TC module.

7. The OLT according to claim 6, wherein a delay requirement of the first upstream service data is higher than a delay requirement of the second upstream service data;
   wherein the first DBA scheduling module is configured to generate the first upstream bandwidth grant comprising a first upstream sending timeslot; and
   wherein the second DBA scheduling module is configured to generate the second upstream bandwidth grant comprising a second upstream sending timeslot or a registration timeslot, wherein the first upstream sending timeslot is used to instruct a registered ONU to send the first upstream service data on the first upstream channel, wherein the second upstream sending timeslot is used to instruct the registered ONU to send the second upstream service data on the second upstream channel, wherein the registration timeslot is used to instruct the unregistered ONU to send the registration response packet on the second upstream channel.

8. The OLT according to claim 7, wherein the OLT further comprises a control module, and wherein the control module is connected to the first DBA scheduling module and the second DBA scheduling module; and
   wherein the control module is configured to: control the first DBA scheduling module to disable the registration function, and control the second DBA scheduling module to enable the registration function, wherein the second upstream bandwidth grant generated by the second DBA scheduling module that enables the registration function comprises the registration timeslot, and wherein the registration timeslot is used to instruct the unregistered ONU to send the registration response packet on the second upstream channel.

9. The OLT according to claim 5, wherein the OLT comprises one DBA scheduling module and a control module connected to the DBA scheduling module;
   wherein the control module is configured to control the DBA scheduling module to enable or disable the registration function;
   wherein when disabling the registration function, the DBA scheduling module is configured to: generate the first upstream bandwidth grant comprising a first upstream sending timeslot, or generate the first upstream bandwidth grant comprising the first upstream sending timeslot and the second upstream bandwidth grant comprising a second upstream sending timeslot; and
   wherein when enabling the registration function, the DBA scheduling module is further configured to generate the first upstream bandwidth grant comprising the first upstream sending timeslot and the second upstream bandwidth grant comprising a registration timeslot, wherein the first upstream sending timeslot is used to instruct a registered ONU to send upstream service data on the first upstream channel, wherein the second upstream sending timeslot is used to instruct the registered ONU to send upstream service data on the second upstream channel, wherein a delay requirement of the first upstream service data is higher than a delay requirement of the second upstream service data, and wherein the registration timeslot is used to instruct the unregistered ONU to send a registration response packet on the second upstream channel.

10. The OLT according to claim 5, wherein the OLT further comprises a memory;
wherein the memory is connected to each DBA scheduling module, and is configured to store the upstream bandwidth grant generated by each DBA scheduling module; and
wherein the upstream TC module is connected to the memory, and is configured to at least one of: control, based on the upstream bandwidth grant, the first upstream burst receiver and the second upstream burst receiver to receive the upstream data, or perform, based on the upstream bandwidth grant, authentication and parsing on the upstream data sent by each ONU.

11. An optical network unit (ONU), wherein the ONU comprises: a downstream transmission convergence (TC) module, at least one dynamic bandwidth allocation (DBA) response module, an upstream TC module, a downstream receiver, a first upstream burst transmitter, and a second upstream burst transmitter, wherein:
the downstream TC module is connected to the downstream receiver and the DBA response module, and is configured to provide, for the DBA response module, downstream data received by the downstream receiver on a downstream channel, wherein the downstream data is sent by an optical line terminal (OLT);
the DBA response module is connected to the upstream TC module, and is configured to control, based on an upstream bandwidth grant comprised in the downstream data, the upstream TC module to send upstream data;
the upstream TC module is connected to the first upstream burst transmitter, and is configured to send the upstream data on a first upstream channel by using the first upstream burst transmitter; and
the upstream TC module is connected to the second upstream burst transmitter, and is configured to send the upstream data on a second upstream channel by using the second upstream burst transmitter, wherein:
the first upstream channel is used to transmit first upstream service data, the second upstream channel is used to transmit a registration response packet and second upstream service data;
the upstream bandwidth grant comprises a first upstream bandwidth grant and a second upstream bandwidth grant;
when the ONU is in a registered state, the first upstream burst transmitter is configured to send the first upstream service data on the first upstream channel based on the first upstream bandwidth grant, and the second upstream burst transmitter is configured to send the second upstream service data on the second upstream channel based on the second upstream bandwidth grant; and
when the ONU is in an unregistered state, the second upstream burst transmitter is configured to send the registration response packet on the second upstream channel based on the second upstream bandwidth grant.

12. The ONU according to claim 11, wherein the ONU comprises a first DBA response module, a second DBA response module, and a demultiplexing module, and wherein:
the demultiplexing module is connected to the downstream TC module, and is configured to demultiplex the upstream bandwidth grant received by the downstream TC module, to obtain the first upstream bandwidth grant and the second upstream bandwidth grant;
the first DBA response module is connected to the demultiplexing module, and is configured to control, based on the first upstream bandwidth grant, the upstream TC module to send the upstream data on the first upstream channel; and
the second DBA response module is connected to the demultiplexing module, and is configured to control, based on the second upstream bandwidth grant, the upstream TC module to send the upstream data on the second upstream channel.

13. The ONU according to claim 11, wherein the ONU comprises an optical module slot, and wherein the optical module slot is used for a first optical module or a second optical module to slot into;
wherein the first optical module comprises at least the downstream receiver and the first upstream burst transmitter; and
wherein the second optical module comprises at least the downstream receiver and the second upstream burst transmitter, wherein:
when the ONU is in the unregistered state, the second optical module is slot into the optical module slot; or
when the ONU is in the registered state, the first optical module is slot into the optical module slot.

14. The ONU according to claim 11, wherein the first upstream channel is used to transmit first upstream service data, wherein the second upstream channel is used to transmit a registration response packet and second upstream service data, and wherein a delay requirement of the first upstream service data is higher than a delay requirement of the second upstream service data;
wherein if the ONU is in a registered state, the upstream TC module is configured to:
send a third enabling signal to the first upstream burst transmitter based on a first upstream sending timeslot in the first upstream bandwidth grant, wherein the third enabling signal is used to instruct the first upstream burst transmitter to send the first upstream service data on the first upstream channel; and
send a fourth enabling signal to the second upstream burst transmitter based on a second upstream sending timeslot in the second upstream bandwidth grant, wherein the fourth enabling signal is used to instruct the second upstream burst transmitter to send the second upstream service data on the second upstream channel; and
wherein if the ONU is in an unregistered state, the upstream TC module is configured to send a fifth enabling signal to the second upstream burst transmitter based on a registration timeslot in the second upstream bandwidth grant, wherein the fifth enabling signal is used to instruct the second upstream burst transmitter to send the registration response packet on the second upstream channel.

15. A method comprising:
sending, by an optical line terminal (OLT), downstream data to an optical network unit (ONU) on a downstream channel, wherein the downstream data comprises a first upstream bandwidth grant and a second upstream bandwidth grant, wherein the OLT and the ONU exchange data on one downstream channel and two upstream channels, wherein the two upstream channels comprise a first upstream channel used to transmit first upstream service data and a second upstream channel used to transmit and registration response packet or second upstream service data, wherein the first upstream bandwidth grant is used to instruct the ONU when it is in a registered state to send the first upstream service data on the first upstream channel, and wherein the second upstream bandwidth grant is used to instruct the ONU when it is in a registered state to send the second upstream service data on the second upstream channel or instruct the ONU when it is in an unregistered state to send the registration response packet on the second upstream channel;

receiving, by the OLT on the first upstream channel, the first upstream service data sent by the ONU when it is in a registered state; and receiving, by the OLT on the second upstream channel, the second upstream service data sent by the ONU when it is in a registered state and the registration response packet sent by the ONU when it is in a registered state.

16. A method comprising:

receiving, by an optical network unit (ONU), downstream data sent by an optical line terminal (OLT) on a downstream channel, wherein the downstream data comprises a first upstream bandwidth grant and a second upstream bandwidth grant, wherein the ONU and the OLT exchange data on one downstream channel and two upstream channels, wherein the two upstream channels comprise a first upstream channel used to transmit first upstream service data and a second upstream channel used to transmit a registration response packet or second upstream service data, wherein the first upstream bandwidth grant is used to instruct the ONU when it is in a registered state to send the first upstream service data on the first upstream channel and wherein the second upstream bandwidth grant is used to instruct the ONU when it is in a registered state to send the second upstream service data on the second upstream channel or instruct the ONU when it is in an unregistered state to send the registration response packet on the second upstream channel;

when the ONU is in a registered state, sending, by the ONU, the first upstream service data on the first upstream channel based on the first upstream bandwidth grant, and the second upstream service data on the second upstream channel based on the second upstream bandwidth grant; and when the ONU is in an unregistered state, sending, by the ONU, the registration response packet on the second upstream channel based on the second upstream bandwidth grant.

* * * * *

UNITED STATES PATENT AND TRADEMARK OFFICE
CERTIFICATE OF CORRECTION

PATENT NO. : 10,756,841 B2
APPLICATION NO. : 16/418886
DATED : August 25, 2020
INVENTOR(S) : Huafeng Lin et al.

It is certified that error appears in the above-identified patent and that said Letters Patent is hereby corrected as shown below:

On the Title Page

Item [56], Line 2, delete "(OTLs)," and insert -- (OLTs), --, therefor.

In the Claims

Column 44, Line 43, Claim 2, delete "demultiplexer" and insert -- demultiplexes --, therefor.

Column 48, Line 65, Claim 15, delete "and" and insert -- a --, therefor.

Column 48, Line 65, Claim 15, delete "or" and insert -- and --, therefor.

Column 50, Line 3, Claim 16, delete "or" and insert -- and --, therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*